United States Patent
Dei et al.

(10) Patent No.: US 7,627,184 B2
(45) Date of Patent: Dec. 1, 2009

(54) CONTENT DISTRIBUTION/RECEPTION DEVICE, CONTENT TRANSMISSION/RECEPTION METHOD, AND CONTENT DISTRIBUTION/RECEPTION PROGRAM

(75) Inventors: Hiroaki Dei, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 563 days.

(21) Appl. No.: 10/578,023

(22) PCT Filed: Nov. 17, 2004

(86) PCT No.: PCT/JP2004/017051

§ 371 (c)(1),
(2), (4) Date: Apr. 28, 2006

(87) PCT Pub. No.: WO2005/050346

PCT Pub. Date: Jun. 2, 2005

(65) Prior Publication Data

US 2007/0036447 A1    Feb. 15, 2007

(30) Foreign Application Priority Data

Nov. 21, 2003  (JP)  .............................. 2003-392617

(51) Int. Cl.
*G06K 9/36*    (2006.01)
(52) U.S. Cl. .................................................... 382/240
(58) Field of Classification Search ......... 382/232–233, 382/236, 240, 244–253; 348/426.01–426.07; 358/384.1, 387.1–403.1, 425.2; 375/240, 375/240.12–240.24, 240.27
See application file for complete search history.

(56) References Cited

U.S. PATENT DOCUMENTS

| | | | | |
|---|---|---|---|---|
| 5,959,672 A | * | 9/1999 | Sasaki | 375/240.23 |
| 6,028,634 A | * | 2/2000 | Yamaguchi et al. | 375/240.16 |
| 6,275,988 B1 | * | 8/2001 | Nagashima et al. | 725/8 |
| 6,289,485 B1 | * | 9/2001 | Shiomoto | 714/779 |
| 7,313,386 B2 | * | 12/2007 | Kondo et al. | 455/414.1 |

FOREIGN PATENT DOCUMENTS

| | | |
|---|---|---|
| EP | 1 311 125 A2 | 5/2003 |
| EP | 1 355 473 A2 | 10/2003 |
| JP | 05-103214 A | 4/1993 |
| JP | 06-339130 A | 12/1994 |
| JP | 2000-295608 A | 10/2000 |
| JP | 2003-134045 A | 5/2003 |
| JP | 2003-152544 A | 5/2003 |
| JP | 2003-152626 A | 5/2003 |
| JP | 2003-152794 A | 5/2003 |
| JP | 2003-241799 A | 8/2003 |
| JP | 2003-244676 A | 8/2003 |
| WO | 03/071801 A1 | 8/2003 |

* cited by examiner

*Primary Examiner*—Jose L Couso
(74) *Attorney, Agent, or Firm*—Sughrue Mion, PLLC

(57) ABSTRACT

A content distribution device includes data output means for outputting encoded data and transmission means for transmitting encoded data which is outputted from the data output means. The data output means outputs encoded data obtained by hierarchical encoding as the encoded data. The transmission means transmits at least a part of data of at least one layer among the encoded data obtained by the hierarchical encoding.

56 Claims, 14 Drawing Sheets

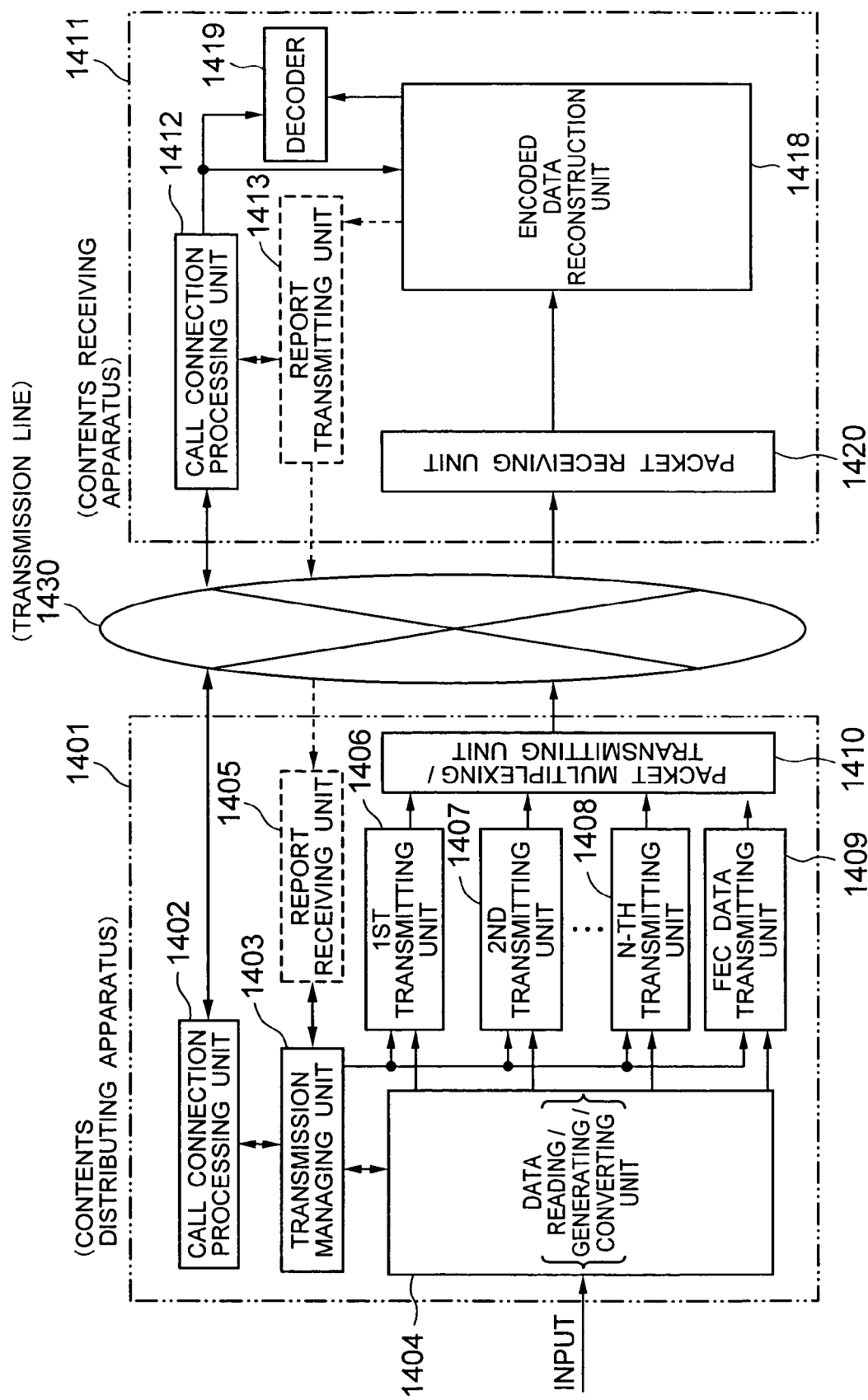

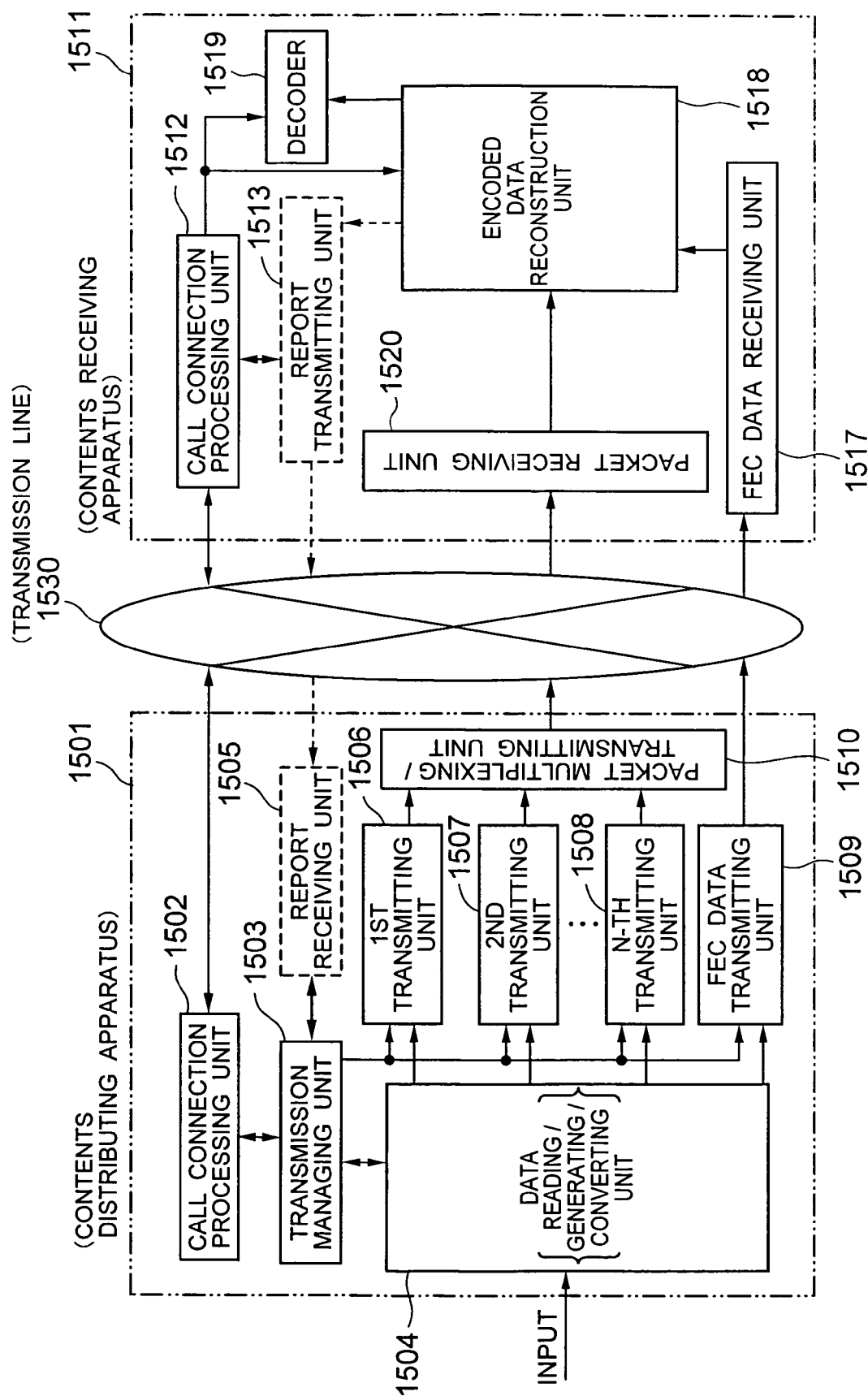

US 7,627,184 B2

CONTENT DISTRIBUTION/RECEPTION DEVICE, CONTENT TRANSMISSION/RECEPTION METHOD, AND CONTENT DISTRIBUTION/RECEPTION PROGRAM

This application claims priority from PCT Application No. PCT/JP2004/017051 filed Nov. 17, 2004, and from Japanese Patent Application No. 2003-392617 filed Nov. 21, 2003, which applications are incorporated herein by reference.

TECHNICAL FIELD

The present invention relates to contents distributing and receiving apparatuses, a contents transmitting/receiving system, contents distributing and receiving methods, and contents distribution and reception programs, which allow improvements in the resistance to data error and data loss of data encoded by hierarchical encoding in network distribution.

BACKGROUND ART

Recently, there has been a spread of contents distribution which distributes contents including moving pictures and audios via a network. Under such circumstances, as a method of efficiently transmitting moving picture data, there is often used a method of transmitting data that is encoded by high-efficient compression based on inter-frame prediction, for example. In these methods, data of prediction parameter obtained by predicting encoded picture from the preceding and following frames in terms of time and the prediction residual picture data are encoded so as to reduce the information amount of the moving picture data which have high correlation in the time direction. Furthermore, the prediction residual picture data is compression-encoded highly efficiently through conversion-encoding and quantization, thereby enabling transmission of contents data with less transmission band.

Typical examples thereof are methods which use compression encoding systems such as MPEG (Moving Picture Experts Group)-1, MPEG-2, and MPEG-4. In these compression encoding systems, inter-frame prediction by motion compensation is performed on the input picture frames by a rectangular area unit of a constant size called a macro block. The obtained motion vector data and signal data that is obtained by compressing the prediction residual picture data through application of two-dimensional discrete cosine conversion and quantization are variable-encoded.

Moreover, for audios, there is also an audio compression method directed to the data encoded by high-efficient compression based on inter-frame prediction such as AAC (Advanced Audio Codec). By employing this method, it becomes possible to distribute the contents data by efficiently utilizing the transmission band of the network.

There are a great number of methods for distributing such contents compression-encoded information to IP (Internet Protocol) network that utilizes a packet switching system. Further, it is expected in the future that such methods be developed into distribution of contents in a mobile communication system. The mobile communication system is a system where mobile stations constituted with PHS (Personal Handyphone Systems), portable telephones, and portable terminals utilizing those as a means for communication are connected through radio stations and radio channels.

There is also known scalable encoding which is capable of varying resolution and picture quality multi-hierarchically (for example, Patent Literature 1)

Patent Literature 1: Japanese Unexamined Patent Publication 9-98434

DISCLOSURE OF THE INVENTION

However, it is not possible with the conventional contents distribution method to properly decode the contents data with an error on the receiver side, if there is generated a transmission data error or transmission packet fault with a long burst characteristic that cannot be decoded even with an error correcting code.

Further, it is common to employ a method of requesting retransmission of the lost data when there is generated a packet loss. However, it is not possible with the contents distribution of multicast/broadcast to employ a method which transmits the error of transmitted data and fault information of the transmission packet from the receiver side to the transmitter side.

When there is generated a packet loss in the case of picture data, for example, there is an error concealment method taken as a measure for the receiver side to generate picture data so as to conceal the error as much as possible from the pictures of the properly-decoded preceding and following frames in terms of time or the peripheral picture data within the same frame. However, it is impossible to eliminate the disturbance of the decoded picture. Furthermore, since the inter-frame prediction is employed, the disturbances of the picture and audio generated once may propagate to the following frames.

In addition, when the error information is returned from the receiver side and transmitted to the transmitter side, the transmission band of the Internet is occupied by this feedback information and the retransmitted data.

The present invention is designed in view of the aforementioned circumstance. The first object of the present invention is to provide contents distributing and receiving apparatuses, a contents transmitting/receiving system, contents distributing and receiving methods, and contents distribution and reception programs, which can suppress as much as possible the significant disturbance of contents reproduced on the receiver side, which is generated due to the transmission error of the encoded data.

Further, the second object of the present invention is to provide contents distributing and receiving apparatuses, a contents transmitting/receiving system, contents distributing and receiving methods, and contents distribution and reception programs, which allow users to set trade-off between the transmission band used for contents transmission and the quality.

Furthermore, the third object of the present invention is to provide contents distributing and receiving apparatuses, a contents transmitting/receiving system, contents distributing and receiving methods, and contents distribution and reception programs, which can achieve the above-described first object of the present invention without sending the feedback information from the receive side to the transmitter side.

Moreover, the fourth object of the present invention is to provide contents distributing and receiving apparatuses, a contents transmitting/receiving system, contents distributing and receiving methods, and contents distribution and reception programs, which allow the transmitter side to control the quality and/or stability of the receive-side contents through controlling whether or not to perform encryption at the time of transmission and/or controlling information to be sent to the receiver side by call connection processing.

Further, the fifth object of the present invention is to provide contents distributing and receiving apparatuses, a contents transmitting/receiving system, contents distributing and receiving methods, and contents distribution and reception programs, which can achieve the aforementioned objects while preventing an increase in the operation amount required for decoding the compression-encoded data.

Furthermore, the sixth object of the present invention is to provide contents distributing and receiving apparatuses, a contents transmitting/receiving system, contents distributing and receiving methods, and contents distribution and reception programs, which can control the power consumption of the receiving apparatus in accordance with the power that can be used on the receiving apparatus side.

In order to achieve the aforementioned objects, a contents distributing apparatus according to the present invention comprises a data output device for outputting encoded data, and a transmitting device for transmitting the encoded data outputted from the data output device, wherein:

the data output device outputs data encoded by hierarchical encoding as the encoded data; and the transmitting device transmits at least a part of data of at least one layer among the data encoded by the hierarchical encoding.

Further, the data output device may output the data encoded by the hierarchical encoding by separating it to respective encoded data of each layer, and the transmitting device may transmit each of the encoded data individually by each layer. Furthermore, the transmitting device may transmit at least a part of referred-information encoded data of at least one layer among the data encoded by the hierarchical encoding.

Further, the transmitting device may transmit, among the data encoded by the hierarchical encoding: a) at least a part of encoded data of one layer; and b) at least a part of referred-information encoded data of at least one layer among remaining layers. Furthermore, the transmitting device may transmit, among the data encoded by the hierarchical encoding: a) at least a part of referred-information encoded data of one layer; and b) at least a part of encoded data of at least one layer among remaining layers.

Also, the transmitting device may comprise a transmission managing unit, wherein the transmission managing unit controls quality and stability and/or confidentiality of distribution contents on the contents distributing apparatus side through controlling at least one of: number of the encoded data to be transmitted; hierarchy of the encoded data; distribution target of a cipher key; encryption method; and degree of encryption. Further, when performing data transmission of a plurality of pieces of encoded data with a time difference provided therebetween, the transmission managing unit may change a compression rate of following encoded data with respect to a compression rate of preceding encoded data with the time difference. Furthermore, the transmission managing unit may select the compression rate in accordance with a distribution rate and/or condition of a transmission line. Moreover, the transmission managing unit may select whether or not to transmit at least a part of the encoded data in accordance with the distribution rate and/or the condition of the transmission line.

Further, the transmitting device may perform data transmission including encoded data of layers higher than hierarchy of the data to be transmitted. Furthermore, the transmission managing unit may control the quality and stability of the distribution contents on a contents distributing side through controlling informing target of session information of a session by which the encoded data is transmitted.

A contents receiving apparatus according to the present invention comprises: a device for receiving encoded data transmitted by a plurality of sessions; a device for receiving the encoded data received by the receiving device, and discriminating and separating individual encoded data units therefrom; and a reconstruction device which extracts encoded data received without a transmission error and a fault from the discriminated and separated encoded data, and reconstructs and outputs encoded data from the extracted encoded data.

Further, when reconstructing the encoded data, the reconstruction device may judge duplication of the encoded data from identifiers given to encoded data transmission units. Furthermore, the reconstruction device may judge a compression rate and/or hierarchy of the encoded data from at least one of: a) an encoded data receiving session determined in advance; b) encoded data identifying information determined in advance, which is given to the encoded data transmission unit; c) an encoded data receiving session informed by call connection processing; and d) the encoded data identifying information which is given to the encoded data transmission unit and informed by the call connection processing. Moreover, there may be provided a report transmitting unit for transmitting a receiving state report to inform condition of a transmission line.

A contents transmitting/receiving system according to the present invention comprises a contents distributing apparatus, a contents receiving apparatus, and a communication network for connecting the contents distributing apparatus and the contents receiving apparatus, wherein:

the contents distributing apparatus comprises a data output device for outputting encoded data, and a transmitting device for transmitting at least a part of data of at least one layer among the data encoded by the hierarchical encoding outputted from the data output device; and the contents receiving apparatus comprises a device for receiving encoded data transmitted by a plurality of sessions;

a device for receiving the encoded data received by the receiving device, and discriminating and separating individual encoded data units therefrom; and a reconstruction device which extracts encoded data received without a transmission error and a fault from the discriminated and separated encoded data, and reconstructs and outputs encoded data from the extracted encoded data.

A contents distributing method according to the present invention comprises the steps of:

an output step of outputting encoded data; and a transmission step of transmitting the encoded data outputted in the output step, wherein data encoded by hierarchical encoding is outputted as the encoded data in the output step, and at least a part of data of at least one layer among the data encoded by the hierarchical encoding is transmitted in the transmission step.

In the output step, the data encoded by the hierarchical encoding may be separated to respective encoded data of each layer to be outputted and, in the transmission step, each of the encoded data may be transmitted by each layer. Further, in the transmission step, there may be transmitted at least a part of referred-information encoded data of at least one layer among the data encoded by the hierarchical encoding. Furthermore, in the transmission step, among the data encoded by the hierarchical encoding, there may be transmitted: a) at least a part of encoded data of a first layer; and b) at least a part of referred-information encoded data of at least one layer among remaining layers.

Moreover, in the transmission step, among the data encoded by the hierarchical encoding, there may be transmitted: a) at least a part of referred-information encoded data of the first layer; and b) at least a part of encoded data of at least one layer among remaining layers.

The quality and stability and/or confidentiality of distribution contents may be controlled on the contents distributing apparatus side through controlling, on the contents distributing side, the number of the encoded data to be transmitted, hierarchy of the encoded data, distribution target of a cipher key and/or encryption method and/or degree of encryption. Further, when performing data transmission of a plurality of pieces of encoded data with a time difference provided therebetween, a compression rate of following encoded data may be changed with respect to a compression rate of preceding encoded data with the time difference. Furthermore, the compression rate may be selected in accordance with a distribution rate and/or condition of a transmission line. Moreover, data transmission may be performed including encoded data of layers higher than hierarchy of the data to be transmitted. Further, the quality and stability of the distribution contents may be controlled on a contents distributing side through controlling informing target of session information of a session by which the encoded data is transmitted.

The output step may comprise at least one of the steps of: (a) an input step of first to N-th encoded data; (b) an input step of encoded data, and a generating step of the first to N-th encoded data from data of at least one layer among the encoded data inputted in the input step;(c) an input step of a first encoded data, and a generating step of second to N-th encoded data from data of at least one layer of the first encoded data inputted in the input step; (d) an encoding step of encoding an inputted signal into the first to N-th encoded data; and (e) an encoding step of encoding the inputted signal into the first encoded data, and a generating step of the second to N-th encoded data from data of at least one layer of the first encoded data inputted in the input step.

(N+1)-th encoded data may be outputted in addition to the N-th encoded data. Identifiers for identifying data may be given to the first to (N+1)-th encoded data. Each of the first to (N+1)-th encoded data may be transmitted by a different session. The first to (N+1)-th encoded data may be multiplexed to be transmitted. Among the first to (N+1)-th encoded data, at least two pieces of encoded data may be multiplexed, and the multiplexed encoded data and remaining encoded data without multiplexing may be transmitted, respectively, by different sessions. A contents distributing side may control an informing target of session information of a session by which the encoded data is transmitted. The first to (N+1)-th encoded data may be distributed with a time difference provided therebetween. The time difference may be set in accordance with condition of a transmission line and/or an encoding compression rate and/or a distribution rate and/or a rule determined in advance.

A contents receiving method according to the present invention comprises the steps of: a receiving step of receiving encoded data transmitted by a plurality of sessions; a step of receiving the encoded data received in the receiving step, and discriminating and separating individual encoded data units therefrom; and a reconstruction step of extracting encoded data received without a transmission error and a fault from the discriminated and separated encoded data, and reconstructing and outputting encoded data from the extracted encoded data.

When reconstructing the encoded data, duplication of the encoded data may be judged from identifiers given to encoded data transmission units. Further, a compression rate and/or hierarchy of the encoded data may be judged from at least one of: a) an encoded data receiving session determined in advance; b) encoded data identifying information determined in advance, which is given to the encoded data transmission unit; c) an encoded data receiving session informed by call connection processing; and d) the encoded data identifying information which is given to the encoded data transmission unit and informed by the call connection processing. A receiving state report may be transmitted for informing condition of a transmission line.

In the receiving step, the encoded data may be received by securing a buffer size determined by at least one of: (a) a receiving buffer size determined in advance; (b) a buffer size informed by call connection processing; and (c) a buffer size calculated based on a contents distributing rate and time-difference setting information, which is set in advance and/or informed by call connection.

A contents transmitting/receiving method, comprising the steps of: an output step of outputting data encoded by hierarchical encoding; a transmission step of transmitting at least a part of data of at least one layer among the data encoded by the hierarchical encoding; a receiving step of receiving encoded data transmitted by a plurality of sessions; a step of discriminating and separating individual encoded data units from the received encoded data; and a reconstruction step of extracting encoded data received without a transmission error and a fault from the discriminated and separated encoded data, and reconstructing and outputting the extracted encoded data.

A contents distribution program according to the present invention allows a computer that constitutes a contents distributing apparatus to execute: a data processing function for outputting encoded data; and a transmission processing function for transmitting the encoded data from the data section, wherein data encoded by hierarchical encoding is outputted as the encoded data through execution of the data processing function, and at least a part of data of at least one layer among the data encoded by the hierarchical encoding is transmitted through execution of the transmission processing function.

The data encoded by the hierarchical encoding may be separated to respective encoded data of each layer to be outputted through execution of the data processing function, and each of the encoded data may be transmitted individually by each layer through execution of the transmission processing function. There may be provided a function of transmitting at least a part of referred-information encoded data of at least one layer among the data encoded by the hierarchical encoding.

There may be provided a function of transmitting, among the data encoded by the hierarchical encoding: a) at least a part of encoded data of a first layer; and b) at least a part of referred-information encoded data of at least one layer among remaining layers. There may be provided a function of transmitting, among the data encoded by the hierarchical encoding: a) at least a part of referred-information encoded data of a first layer; and b) at least a part of encoded data of at least one layer among remaining layers.

There may be provided a function of controlling quality and stability and/or confidentiality of distribution contents on the contents distributing apparatus side through controlling the number of the encoded data to be transmitted, hierarchy of the encoded data, distribution target of a cipher key and/or encryption method and/or degree of encryption. When performing data transmission of a plurality of pieces of encoded data with a time difference provided therebetween, a compression rate of following encoded data may be changed with respect to a compression rate of preceding encoded data with the time difference. There may be provided a function of selecting the compression rate in accordance with a distribution rate and/or condition of a transmission line. There may be provided a function of performing data transmission including encoded data of layers higher than hierarchy of the data to be transmitted. There may be provided a function of controlling the quality and stability of the distribution contents on a contents distributing side through controlling informing target of session information of a session by which the encoded data is transmitted.

A contents reception program according to the present invention allows a computer that constitutes a contents receiving apparatus to execute: a reception processing function for receiving encoded data transmitted by a plurality of sessions; a processing function for receiving the encoded data received in the receiving step, and discriminating and separating individual encoded data units therefrom; and a reconstruction processing function for extracting encoded data received without a transmission error and a fault from the discriminated and separated encoded data, and reconstructing and outputting encoded data from the extracted encoded data.

There may be provided a function of judging duplication of the encoded data from identifiers given to encoded data transmission units when reconstructing the encoded data. Further, there may be provided a function of judging a compression rate and/or hierarchy of the encoded data from at least one of: a) an encoded data receiving session determined in advance; b) encoded data identifying information determined in advance, which is given to the encoded data transmission unit; c) an encoded data receiving session informed by call connection processing; and d) the encoded data identifying information which is given to the encoded data transmission unit and informed by the call connection processing.

With the present invention as described above, when distributing the contents from the transmitter side to the receiver side, the transmitter side of the contents distributing apparatus transmits, by a session, at least a part of the data of at least one layer among the data encoded by hierarchical (scalable) encoding. Therefore, when distributing the contents via a network, it is possible to improve the reliability of the data received by the receiver even under distribution via an unstable transmission line such as a radio transmission line, while suppressing an increase in the amount of distribution data to be small. In addition, the contents can be provided with the stable quality. Moreover, it is possible to provide the contents with the quality that is best suited for the receiving environment of the contents receiver.

Furthermore, by changing the compression rates of the preceding and following distribution data with a time difference provided therebetween, expansion of the transmission band of the Internet network can be suppressed. Thus, increases in the processing amount for improving the reliability of the distribution data can be suppressed as small on both the transmitter and receiver sides.

Through individually transmitting the transmission data by a plurality of sessions when transmitting picture data, there is provided the low possibility for the entire data to receive an influence of the error and loss, thereby decreasing the deterioration in the picture due to the error and loss.

Further, the user can set the trade-off between the transmission band used for contents data transmission and the quality by setting the compression rate of the picture data (encoded data) of the hierarchical structure in accordance with the transmission band. For the compression rate, when there is no margin in the transmission band, for example, the compression rate of the following picture data is set higher. However, if there is a fault in the preceding picture data in this case, it is refilled with the following picture data. Thus, the picture quality of that section can be made better than the case of decoding it with the fault remained. The compression rate can be set in accordance with such trade-off between the transmission band and the quality to be maintained.

In general, when there is a fault in the received data, the receiver side requests (feedback) the retransmission of the fault data to the transmitter side. In the invention, however, the fault data is refilled by using the data transmitted in parallel, so that a retransmission request for the transmitter side becomes unnecessary.

Furthermore, the quality of the receiver side can be controlled on the distributing side by informing, from the distributing side to the receiver side, only the setting (multicast address, port number, used encoding tool for the case of multicast distribution) of the distributing session of the data qualified to be received among the picture data (encoded data) of a hierarchical structure. Thus, the quality and the stability of the contents on the receiver side can be controlled on the transmitter side.

For example, both the above-described setting of the session for distributing the data with a low compression rate and the setting of the session for distributing the data with a high compression rate are informed to a receiver A, and only the above-described setting of the session for distributing the data with a high compression rate is informed to a receiver B. With this, the quality (picture quality, loss resistance) of the received data of the receiver A and the receiver B can be controlled.

For the received data, detection of the fault and refilling the fault data is carried out before decoding, and the data that has been refilled and reconstructed at last is decoded. Therefore, it is possible to prevent an increase in the operation amount required for decoding the compression-encoded data. That is, unlike the technique which decodes all of a plurality of pieces of received data and refills the fault data with the decoded result, the present invention can suppress the increase in the operation amount to be small.

Moreover, the power consumption on the receiver side can be suppressed to be small by controlling the receiving number of encoded data in accordance with the power that can be used on the receiver side. With this, the receivable time of the contents under a battery-use environment can be extended dramatically.

BRIEF DESCRIPTION OF THE DRAWINGS

[FIG. 13] A block diagram for showing a fifth embodiment of the present invention; and

[FIG. 14] A block diagram for showing a sixth embodiment of the present invention.

BEST MODE FOR CARRYING OUT THE INVENTION

Figure 1:
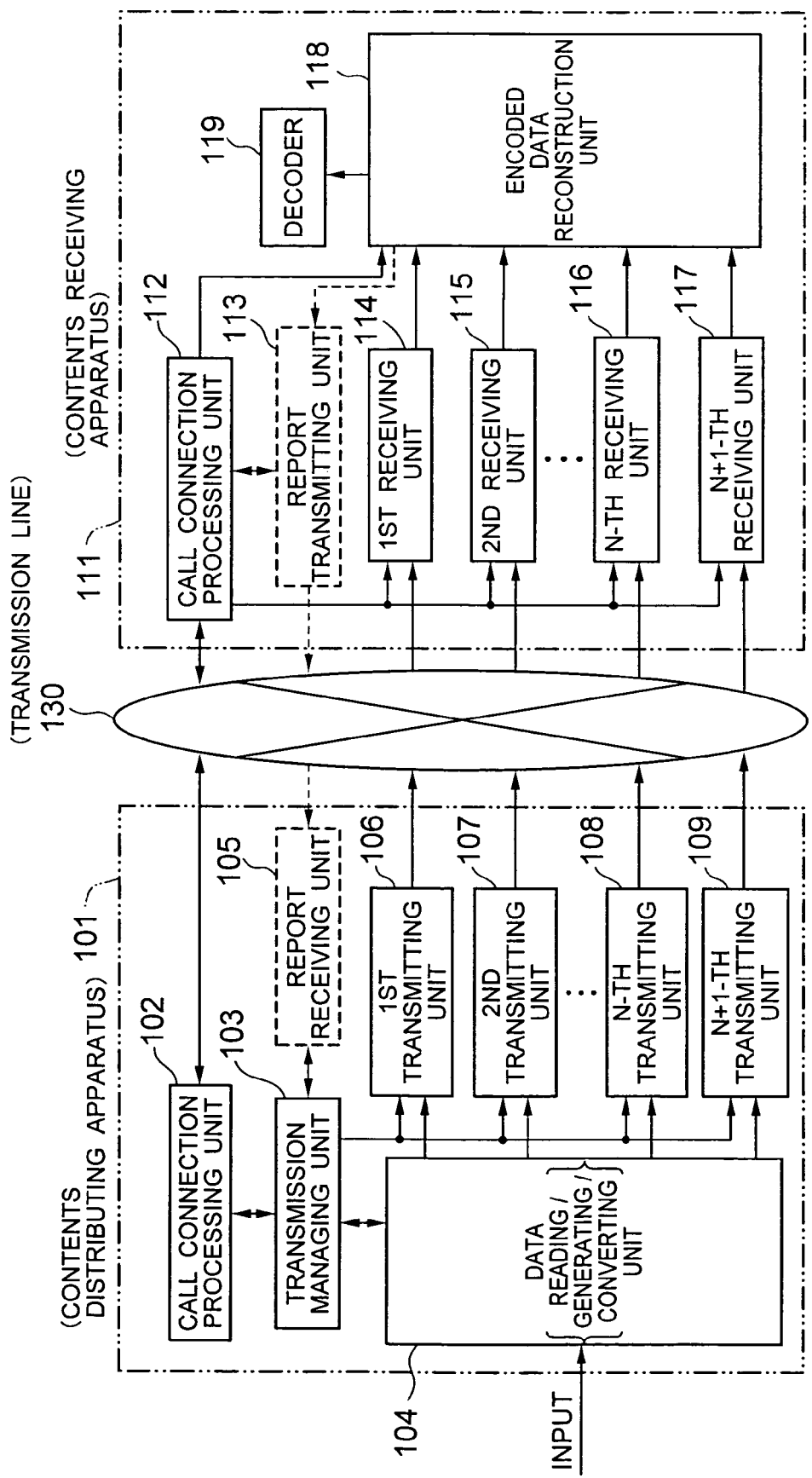
[FIG. 1] A block diagram for showing a first embodiment of the present invention.

Embodiments of the present invention will be described hereinafter by referring to the accompanying drawings.

As the fundamental structure, a contents distributing apparatus according to the present invention comprises data output devices (104, 804, 1104, 1204, 1404) for outputting encoded data and transmitting devices (106-109, 806-809, 1106-1109, 1206-1209, 1407-1409, 1506-1509) for transmitting the encoded data outputted from the data output devices. The data output devices output the data encoded by hierarchical encoding as the encoded data. The transmitting devices transmit at least a part of data of at least one layer among the data encoded by the hierarchical encoding.

A contents distributing method for distributing contents by utilizing the content distributing apparatus according to the present invention executes an output step of outputting the encoded data by the data output devices, and a transmission step of transmitting the encoded data outputted from the data output devices in the output step by the transmitting device. In the output step, the data encoded by hierarchical encoding is outputted as the encoded data and, in the transmission step, at least a part of data of at least one layer is transmitted among the data encoded by the hierarchical encoding.

As the fundamental structure, a contents receiving apparatus according to the present invention for receiving the contents data distributed from the contents distributing apparatus comprises: devices (114-117, 820, 1120, 1117, 1214-1217, 1420, 1520) for receiving the encoded data transmitted by a plurality of sessions; devices (118, 818, 1118, 1218, 1418, 1518) for receiving the encoded data received in the receiving units and discriminating and separating the individual encoded data units therefrom; and reconstruction devices (118, 818, 1118, 1218, 1418, 1518) for extracting the encoded data received without transmission error with no fault from the discriminated and separated encoded data, and reconstructing and outputting the encoded data from the extracted encoded data.

A contents receiving method for receiving the contents distributed by using the contents distributing apparatus according to the present invention executes: a receiving step of receiving the encoded data transmitted by a plurality of sessions by the receiving devices; a step of discriminating and separating the individual encoded data units from the encoded data received in the receiving step; and reconstruction step of extracting the encoded data received without transmission error with no fault from the discriminated and separated encoded data, and reconstructing and outputting the encoded data from the extracted encoded data.

In order to build a contents transmitting/receiving system for distributing contents between the transmitter side and the receiver side, the present invention comprises, as the fundamental structure, the above-described contents distributing apparatus, the above-described contents receiving apparatus, and communication networks (130, 830, 1130, 1230, 1430, 1530) for connecting the contents distributing apparatus and the contents receiving apparatus, wherein at least a part of the data of at least one layer among the data encoded by the hierarchical encoding is transmitted from the contents distributing apparatus, and the transmitted encoded data is reconstructed by the contents receiving apparatus.

As the fundamental structure, a contents transmitting/receiving method for performing contents distribution between the transmitter side and the receiver side, the present invention executes each step of the contents distributing method on the contents distributing side and executes each step of the contents receiving method on the contents receiver side, wherein the contents distributing side transmits at least a part of the data of at least one layer among the data encoded by the hierarchical encoding, and the contents receiver side reconstructs the transmitted encoded data.

Further, a contents distribution program for executing the contents distributing method by the contents distributing apparatus according to the present invention, as the fundamental structure, allows a computer that constitutes the contents distributing apparatus to execute a data processing function for outputting the encoded data and a transmission processing function for transmitting the encoded data from the data section, thereby comprising the functions of: outputting the data encoded by the hierarchical encoding as the encoded data through executing the data processing function; and transmitting at least a part of the data of at least one layer among the data encoded by the hierarchical encoding by executing the transmission processing function.

Furthermore, a contents reception program for executing the contents receiving method by the contents receiving apparatus according to the present invention, as the fundamental structure, allows a computer that constitutes the contents receiving apparatus to execute the functions of: a reception processing function for receiving the encoded data transmitted by a plurality of sessions; a processing function for receiving the encoded data received by the receiving devices and discriminating and separating the encoded data unit therefrom; and a reconstruction processing function for extracting the encoded data received without transmission error with no fault from the discriminated and separated encoded data, and reconstructing and outputting the encoded data from the extracted encoded data.

FIRST EMBODIMENT

Next, the present invention will be described in detail by referring to specific examples. A first embodiment shown in FIG. 1 performs transmission and reception of N-number of encoded data of the same contents encoded by the hierarchical (scalable) encoding method of M-layers. "N" and "M" are integers of 2 or larger.

The embodiment comprises, on the transmitter side, first to N-th encoded data transmitting devices and an N+1-th encoded data transmitting device, and each transmitting device transmits the encoded data by a different session from each other. The receiver side comprises first to N-th encoded data receiving devices and an N+1-th encoded data receiving device, which extract the encoded data received without transmission error with no fault and performs reconstruction and output thereof.

In the embodiment, the contents distributing apparatus may comprise a device for setting routing priority control in the transmission lines and power control in the radio transmission lines for each session in at least one of the sessions for transmitting the encoded data, and a picture data receiving apparatus may comprise a device for selecting reception of at least one session based on at least one of: the error/loss rate of the received data; power that can be used in the receiving apparatus; and the setting determined in advance.

As shown in FIG. 1, the embodiment is constituted with a contents distributing apparatus 101, a contents receiving apparatus 111, and a transmission line 130 for transmitting the contents data from the contents distributing apparatus 101 to the contents receiving apparatus 111. The contents distributing apparatus 101 is connected to the transmission line 130 as the IP (Internet Protocol) network, and distributes the encoded data by using UDP (User Datagram Protocol)/IP.

The contents receiving apparatus 111 is a client terminal connected to the transmission line 130. For simplifying the explanation, it is assumed that the contents to be distributed herein are moving picture data.

The contents distributing apparatus 101 transmits the N-number of moving-picture encoded data encoded by the scalable encoding method of M-layers with "M" and "N" being integers of 2 or larger from the first to N+1-th transmitting units 106-109 to the contents receiving apparatus 111 via the transmission line 130 based on the transmission setting set in a transmission managing unit 103. The contents receiving apparatus 111 receives the moving-picture encoded data by the first to N+1- the receiving units 114-117 according to call processing performed between a call connection processing unit 112 of the contents receiving apparatus 111 and a call connection processing unit 102 of the contents distributing apparatus 101, and reconstructs and decode one piece of the moving-picture encoded data among the moving-picture encoded data received without data error and fault in accordance with the compression rate.

In the followings, the contents distributing apparatus 101 and the contents receiving apparatus 111 will be described in detail.

The transmission managing unit 103 of the contents distributing apparatus 101 sets at least one of:
(a) the compression rates of the first to N-th encoded data outputted from a data reading/generating/converting unit 104;
(b) the transmission-target address and port number to which transmission is performed from the first to N+1-th transmitting units 106-109;
(c) the identifying information of the encoded data transmitted from the first to N+1-th transmitting units 106-109;
(d) the layers of the encoded data transmitted from the first to N+1-th transmitting units 106-109;
(e) types (intra/inter frame) of the information transmitted from the first to N+1-th transmitting units 106-109;
(f) whether or not to perform encryption on the encoded data to be transmitted from the first to N+1-th transmitting units 106-109;
(g) cipher key data of the encoded data to be transmitted from the first to N+1-th transmitting units 106-109;
(h) transmission time difference of encoded data transmitted from the first to N+1-th transmitting units 106-109; and
(i) the routing priority of the transmission lines in the sessions where the first to N+1-th transmitting units 106-109 perform transmission, and transmission power in the radio transmission lines. Based upon this, there is performed connection processing between the call connection processing unit 102 and the call connection processing unit 112 of the contents receiving apparatus 111 by RTSP (Real Time Streaming Protocol)/SDP (Session Description Protocol) and the like, for example. It is also possible to set all of those in advance between the contents distributing apparatus 101 and the contents receiving apparatus 111 and perform transmission and reception of contents.

The data reading/generating/converting unit 104 outputs the N-number of moving-picture scalable encoded data constituted with M-layers to the first to N+1-th transmitting units 106-109, which are obtained through one of:
(a) reading the stored moving-picture encoded data;
(b) generating the moving-picture encoded data through encoding the inputted video in real-time; and
(c) generating the moving-picture encoded data through converting the inputted moving-picture encoded data, based on the setting set by the transmission managing unit 103 and/or the setting set in advance between the contents distributing apparatus 101 and the contents receiving apparatus 111. This will be described by referring to FIG. 2-FIG. 5.

Figure 2:
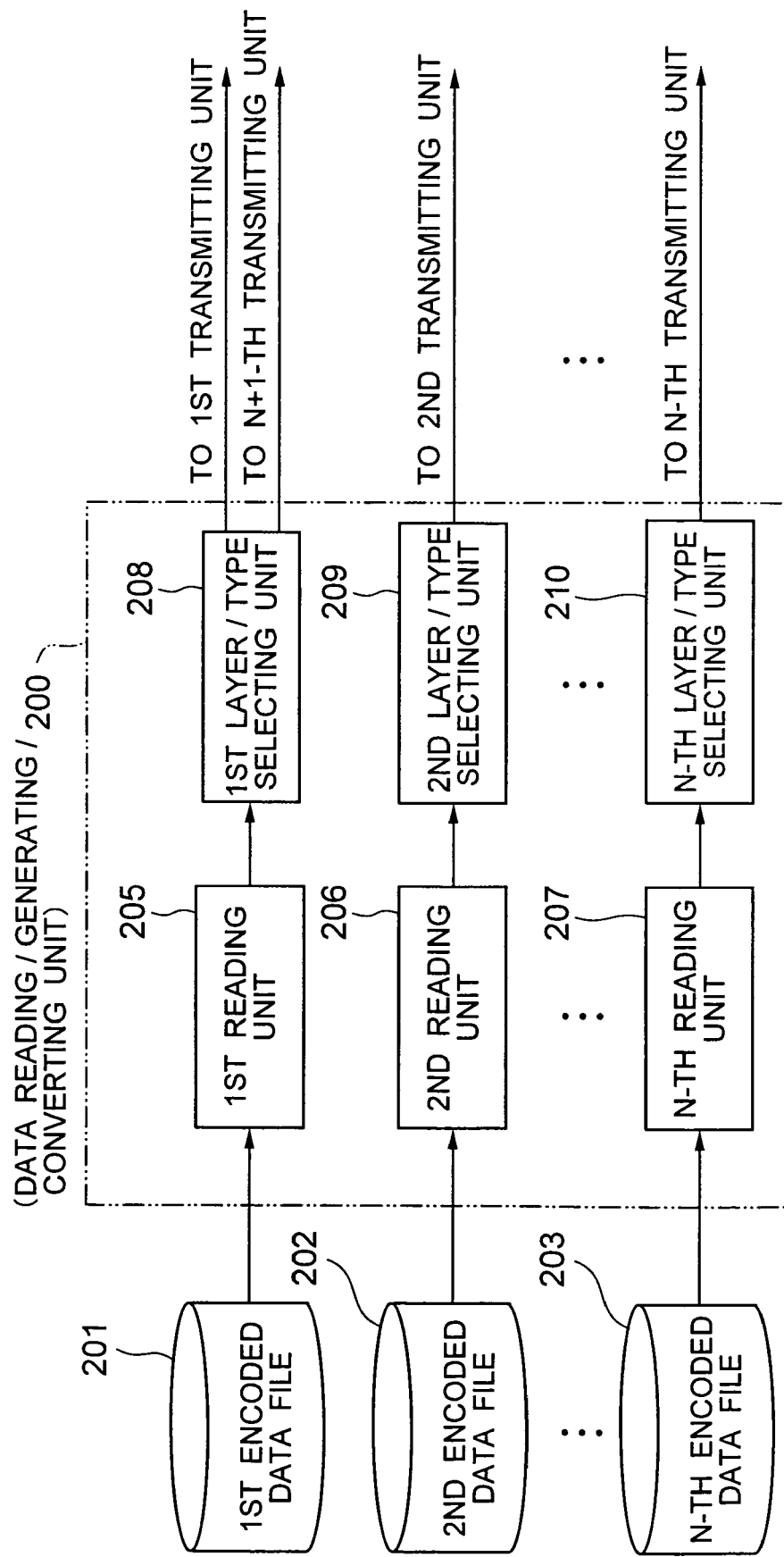
[FIG. 2] A block diagram for showing a data reading/generating/converting unit (a first example) of FIG. 1.

A data reading/generating/converting unit 200 of FIG. 2 corresponds to the data reading/generating/converting unit 104 of FIG. 1. First to N-th reading units 205-207 of the data reading/generating/converting unit 200 shown in FIG. 2 read the first to N-th encoded data files 201-203. Based on the setting set in advance, first to N-th layer/type selecting units 208-210 select, respectively, the hierarchy of the encoded data to be outputted and the types such as intra (information to be referred to)/inter (referring information) frames for outputting read encoded data to the first to N+1-th transmitting units 106-109. At this time, some of the encoded data files 201-203 may be the same file.

Figure 3:
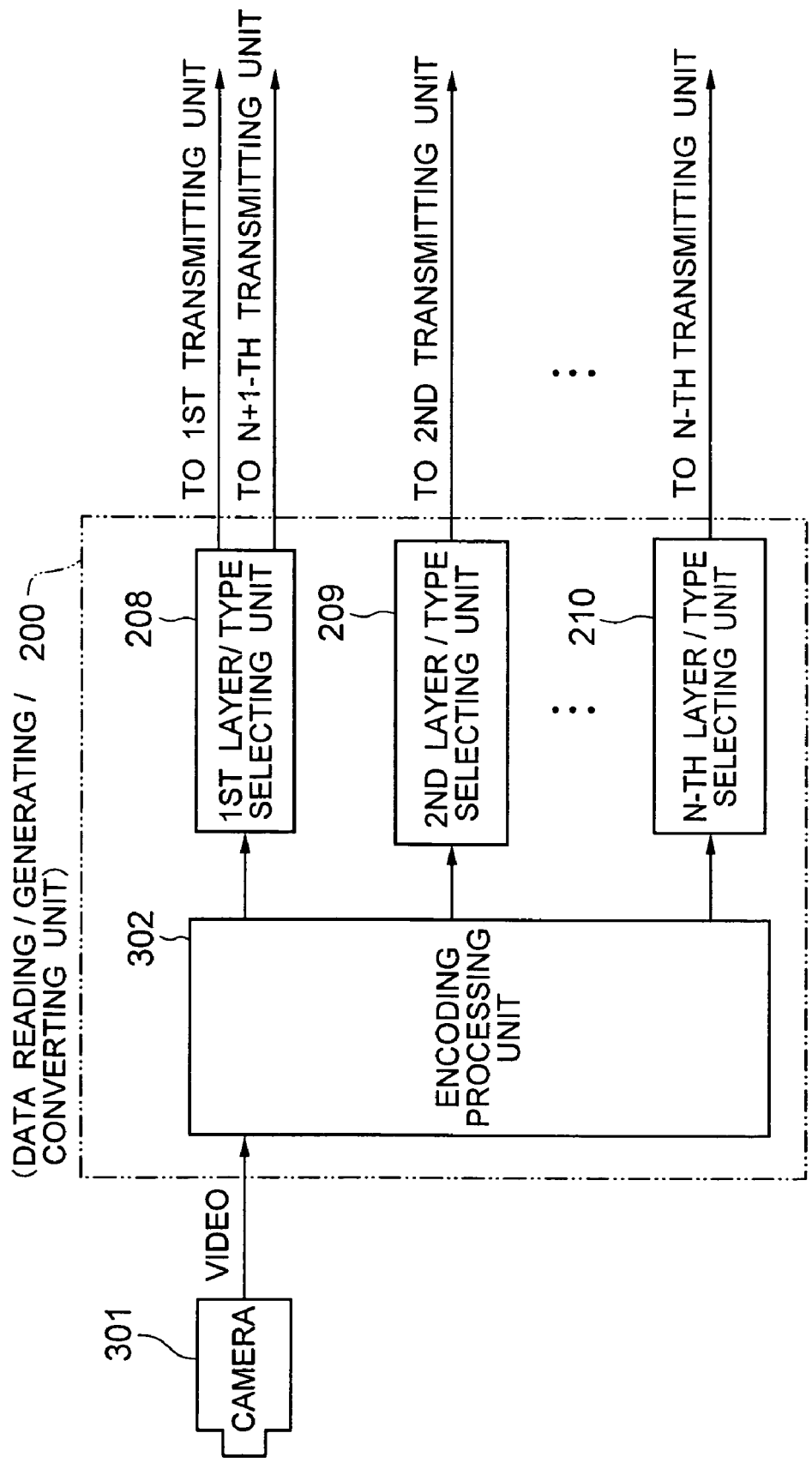
[FIG. 3] A block diagram for showing a data reading/generating/converting unit (a second example) of FIG. 1.

A data reading/generating/converting unit 200 of FIG. 3 corresponds to the data reading/generating/converting unit 104 of FIG. 1. An encoding processing unit 302 of the data reading/generating/converting unit 200 of FIG. 3 generates the first to N-the encoded data from the video inputted data of a camera 301 and the like and, as in FIG. 2, after performing selecting processing of the encoded data in the first to N+1-th layer/type selecting units 208-210, outputs the data to the respective first to N+1-th transmitting units 106-109. At this time, some of the first to N-th encoded data may be the same encoded data.

Figure 4:
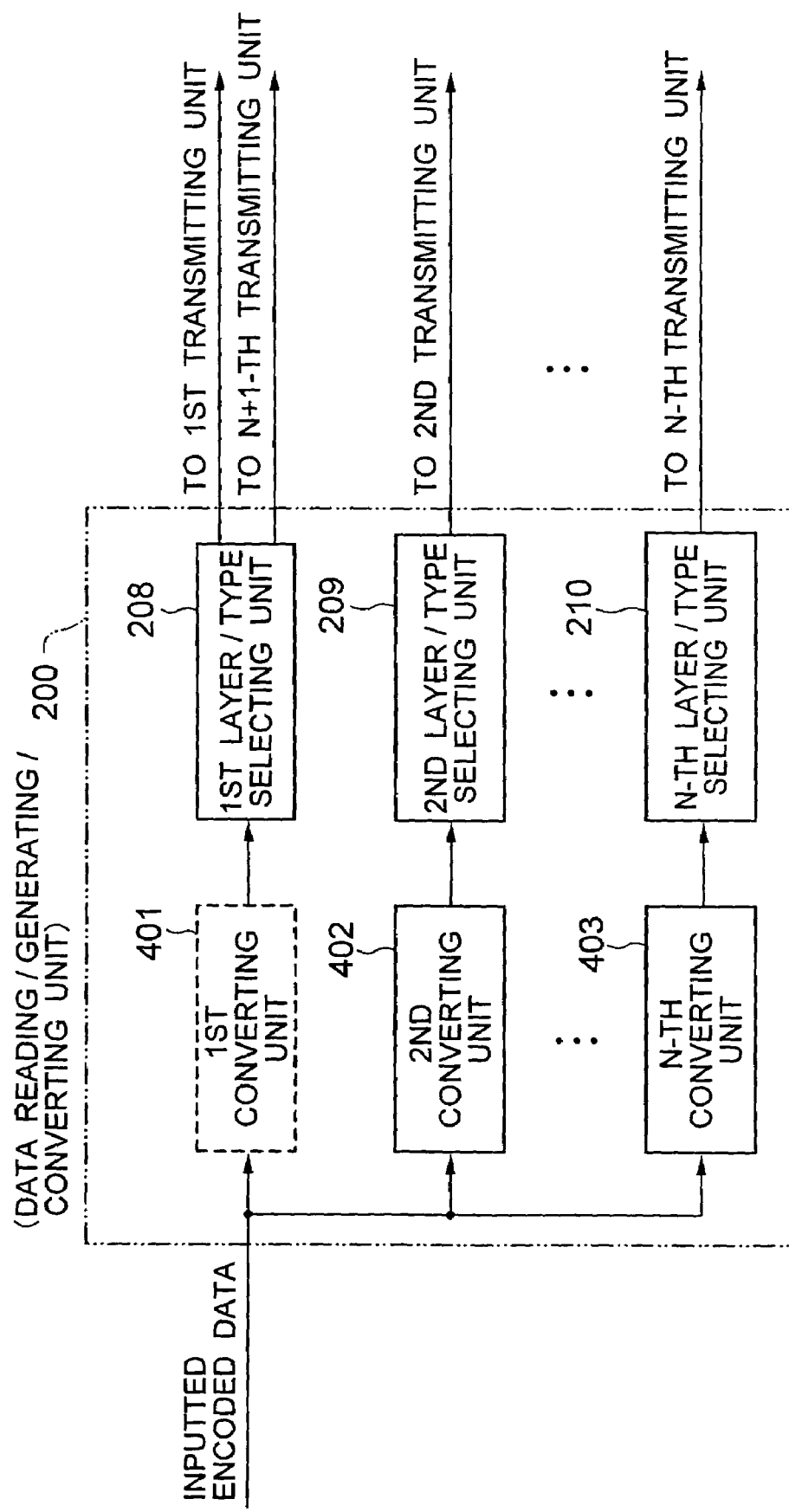
[FIG. 4] A block diagram for showing a data reading/generating/converting unit (a third example) of FIG. 1.

A data reading/generating/converting unit 200 of FIG. 4 corresponds to the data reading/generating/converting unit 104 of FIG. 1. The data reading/generating/converting unit 200 of FIG. 4 performs, on the inputted encoded data, at least one of:
(a) codec type (including profile/level) conversion;
(b) Frame structure conversion;
(c) frame rate conversion;
(d) compression rate conversion;
(e) intra-frame interval conversion;
(f) image size conversion;
(g) trimming processing; and
(h) various kinds of filtering processing, by at least one of first to N-th conversion units 401-403 for converting the inputted encoded data to generate the first to N-th encoded data.

As in the cases of FIG. 2 and FIG. 3, after selecting the encoded data by the first to N-th layer/type selecting units 208-210, each of the data is outputted to the first to N+1-th transmitting units 106-109. At this time, some of the first to N-th encoded data may be the same encoded data. Further, the first to N-th conversion units 401-403 may include a conversion unit that outputs the inputted encoded data as it is. For example, the first conversion unit 401 as illustrated with a broken line may be set to output the inputted encoded data without conversion.

Figure 5:
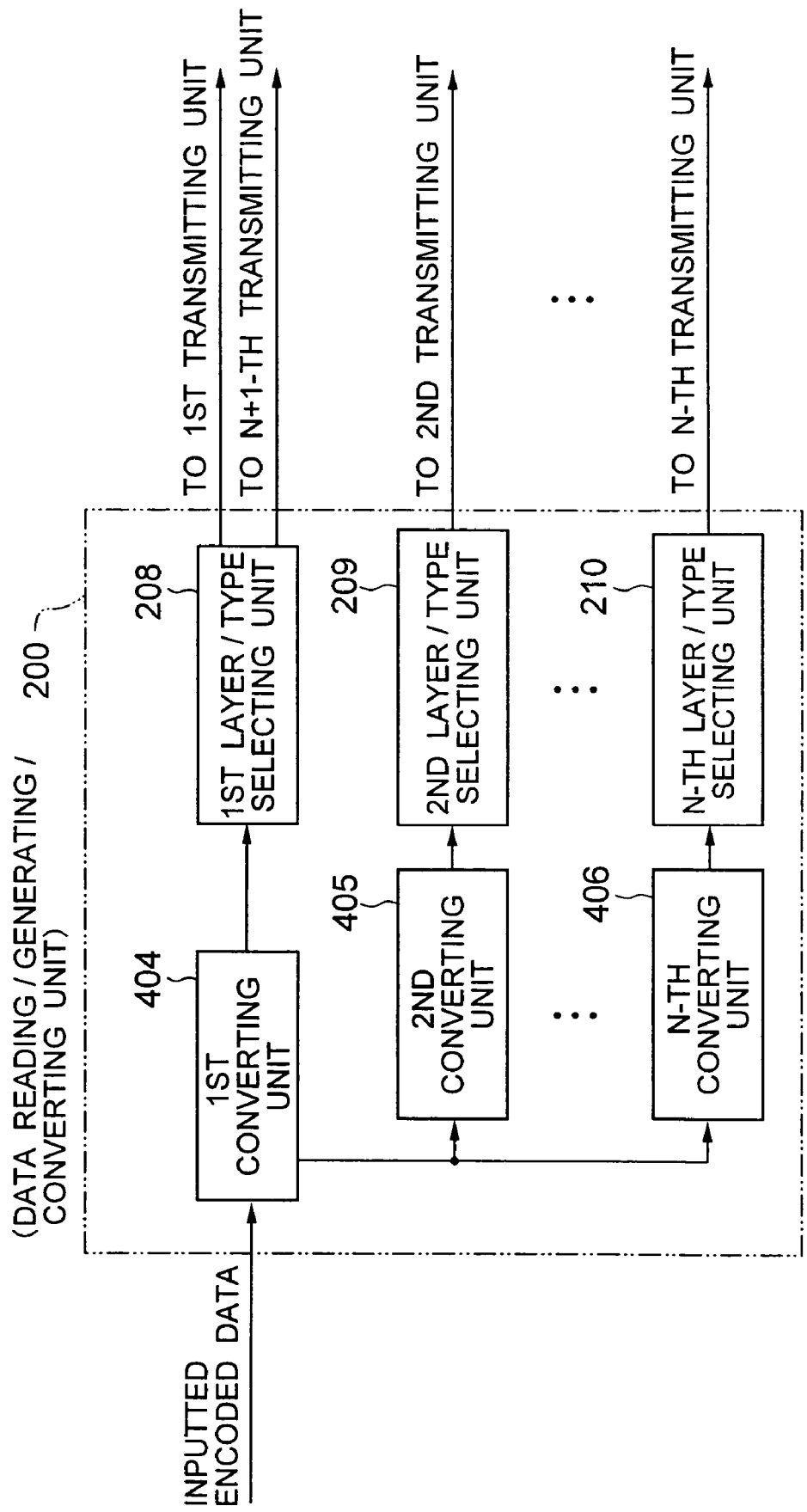
[FIG. 5] A block diagram for showing a data reading/generating/converting unit (a fourth example) of FIG. 1.

Further, like the second to N-th encoded data conversion units 405-406 as shown in FIG. 5, the second to N-th encoded data may be generated by converting the encoding parameter of the first encoded data generated by the first encoded data conversion unit 404 or that of the first encoded data in the middle of conversion. Furthermore, the first to N-th encoded data may be generated in the first to N-th encoded data conversion units 401-403 and 404-406 by using the data of a part of layers (for example, the first layer only) of the inputted encoded data.

The above-described first to N-th encoded data outputted from the data reading/generating/converting units 200 shown in FIG. 2-FIG. 5 are necessary to be of the same media, same encoding method, same frame structure, same frame rate, same intra-frame interval, and same picture size.

The first to N+1-th transmitting units 106-109 transmit the first to N-th encoded data to the contents receiving apparatus 111 via the transmission line 130 based on the setting in the transmission managing unit 103 and/or the setting determined in advance between the contents distributing apparatus 101 and the contents receiving apparatus 111. This processing will be described by referring to FIG. 6.

Figure 6:
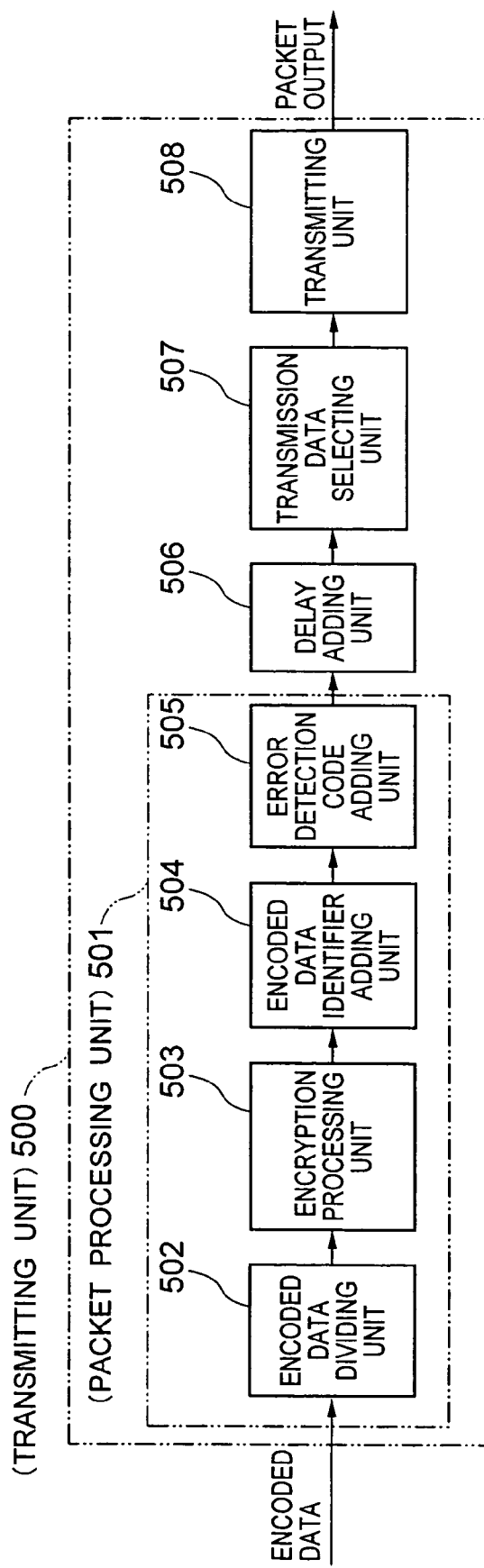
[FIG. 6] A block diagram for showing first to N+1-th transmitting units of FIG. 1.

A transmitting unit 500 shown in FIG. 6 corresponds to the transmitting units 106-109 of FIG. 1, and one of the transmitting units 500 corresponding to those will be described. The transmitting unit 500 shown in FIG. 6 processes the inputted encoded data into packets by a packet processing unit 501. An encoded data dividing unit 502 divides the encoded data into the encoded data transmission units to be in packets; An encryption processing unit 503 performs encryption on the encoded data when there is required the encryption based on the setting, i.e. with or without encryption, cipher key, degree of encryption. The method of encryption is out of the scope of the present invention, so that the detailed description thereof will be omitted. An encoded data identifier adding unit 504 uses payload type of RTP (Real-time Transport Protocol) header, SSRC (Synchronization Source identifier), CSRC (Contributing Source identifier), for example, or adds identifying information corresponding to those, so as to identify the extent of compression rate of the inputted encoded data and/or which hierarchy of the scalable encoding the data belongs to.

The contents receiving apparatus Ill can grasp the compression rate and/or the layer of the encoded data based on the call connection processing and/or the correspondence between the compression rate and the identifying information determined in advance between the contents distributing apparatus 101 and the contents receiving apparatus 111. An error detection code adding unit 505 adds the check sum of the UDP header or the information corresponding thereto. There is added delay to the packet outputted from the packet processing unit 501 according to the delay amount set in a delay adding unit 506 such that the packet is outputted with a time difference provided between other transmitting units.

The encoded data dividing unit 502 divides the inputted encoded data into the encoded data transmission units to be the data of the same layer, which is obtained by scalable-encoding the information of the same frame and same part by the first to N+1-th transmitting units 106-109, like the video packet of the MPEG-4 encoding, for example. In this case, the encoded data identifier adding unit 504 adds, to the same transmission units of each transmitting unit, the sequence number of the RTP header or the same identification number corresponding thereto. Thereby, the contents receiving apparatus 111 can select the data by the transmission unit when there is a plurality of pieces of duplicated encoded data being received. Furthermore, it is possible to rearrange the encoded data correctly even if the order of the received encoded data is switched.

Through performing encryption of the first to N+1-th transmitting units 106-109 only on the specific hierarchy or lower or only by the specific transmitting unit and thereafter and controlling the distribution of the cipher key by each contents receiving apparatus 111, it is possible on the contents distributing apparatus 101 side to control the degree of the quality (picture quality) and the quality stability of the contents reproduced by the contents receiving apparatus 111. Furthermore, when the RTCP (RTP Control Protocol) receiving-state report or the information corresponding thereto can be obtained from the contents receiving apparatus 111, the delay amount added in the first to N+1-th transmitting units 106-109 can be kinetically altered even during the distribution of contents, e.g., increases the delay amount when the packet loss rate is high and/or burst length of the packet loss is long. In such a case, it is desirable to inform the altered delay amount to the contents receiving apparatus 111 from the call connection processing unit 102 of the contents distributing apparatus 101.

For delaying, any one of the first to N-th encoded data may be transmitted at first. There may be employed a method in which a time difference is provided between the encoded data transmitted at first and the data transmitted thereafter or a method in which the encoded data is transmitted successively by providing a time difference therebetween. A transmission data selecting unit 507 selects the packet of the encoded data to be transmitted based on the transmission data selection setting, and transmits the packet from a transmitting unit 508 to the transmission line 130 by each session in accordance with the routing priority in the transmission line and the setting of the transmission power of the radio transmission line.

Regarding the first to N-th encoded data transmitted from the first to N+1-th transmitting units 106-109, the followings may be performed:

(a) each of the first to N-th transmitting units 106-108 transmits data of at least one layer of the first to N-th encoded data, and the N+1-th transmitting unit 109 transmits the data of at least one layer of the first encoded data;

(b) each of the first to N-th transmitting units 106-108 transmits data of the first layer (base layer) of the first to N-th encoded data, and the N+1-th transmitting unit 109 transmits the first encoded data;

(c) each of the first to N-th transmitting units 106-108 transmits data of the first layer of the first to N-th encoded data, and the N+1-th transmitting unit 109 transmits the data of the second layer and thereafter (extended layers) of the first encoded data;

(d) each of the first to N-th transmitting units 106-108 transmits the data of the first layer of the first to N-th encoded data and the encoded data of the referred information (intra-frame) of the second layer and thereafter where there is no prediction performed in the time direction, and the N+1-th transmitting unit 109 transmits the encoded data of the referring information (inter-frame) of the first encoded data;

(e) each of the first to N-th transmitting units 106-108 transmits the data of the first layer of the first to N-th encoded data and the encoded data of the referred information (intra-frame) of the second layer and thereafter where there is no prediction performed in the time direction, and the N+1-th transmitting unit 109 transmits the first encoded data;

(f) each of the first to N-th transmitting units 106-108 transmits the encoded data of the referred information of the first to N-th encoded data where there is no prediction performed in the time direction.

The N+1-th transmitting unit 109 transmits the encoded data of the referring information of the first layer of the first encoded data where prediction in the time direction is performed, and the encoded data of the second layer and thereafter.

(g) each of the first to N-th transmitting units 106-108 transmits the encoded data of the referred information of the first to N-th encoded data where there is no prediction performed in the time direction, and the N+1-th transmitting unit 109 transmits the first encoded data;

(h) each of the first to N-th transmitting units 106-108 transmits the encoded data of the referred information of the first layer of the first to N-th encoded data where there is no prediction performed in the time direction, and the N+1-th transmitting unit 109 transmits the encoded data of the referring information of the first layer of the first encoded data where prediction in the time direction is performed, and the encoded data of the second layer and thereafter; and (i) each of the first to N-th transmitting units 106-108 transmits the encoded data of the referred information of the first layer of the first to N-th encoded data where there is no prediction performed in the time direction, and the N+1-th transmitting unit 109 transmits the first encoded data.

As has been described above, among the encoded data transmitted in any of the above-described ways, the packet to be transmitted is appropriately selected further in accordance with the characteristic of the picture and the condition of the transmission line. For this selection, the packet may be selected and transmitted by each specific cycle (once for every n-packets), for example. Alternatively, the packet to be transmitted may be determined appropriately by referring to the characteristic parameter within the encoded data, e.g., the motion vector, which is a parameter having a large influence on the decoded picture by the bit error or the packet loss, or may be selected in accordance with a rule that is, for example, to select the referred frame (intra-frame) at all times. This selecting method is capable of changing the selection setting kinetically even during distribution of the contents.

Moreover, for keeping the high quality (picture quality) and the high stability of the contents to be reproduced in the contents receiving apparatus 111, it is desirable to set such that the data of the higher layer among the first to N-th scalable encoded data transmitted at this time is transmitted in more transmitting units and the data of the higher layer is transmitted without fail. Therefore, in the case where it is necessary to reduce the amount of the transmission encoded data, the transmission data selecting unit 507 stops the transmission of the encoded data from the lower layer among the encoded data transmitted from the transmitting units.

Furthermore, for efficiently using the band of the network, either of the following methods may be employed:

(a) the compression rates of the second to N-th encoded data are set as the same or more than that of the first encoded data; and (b) the compression rate of the K-th encoded data ("K" is an integer of 2 or larger and N or smaller) is set as the same or more than that of the (K–1)-th encoded data.

Moreover, when the RTCP (RTP Control Protocol) receiving-state report or the information corresponding thereto can be obtained from the contents receiving apparatus 111, the setting of the compression rates can be kinetically altered even during the distribution of contents, e.g., increases the compression rates of the first to N-th encoded data when the packet loss rate is high. In addition, in the case where it requires more reduction in the amount of the transmission encoded data, it is possible to stop the transmission of any encoded data from the first to N-th transmitting units 102-108.

Further, the contents distributing apparatus 101 can control the degree of the quality (picture quality) and the quality stability of the contents, to be reproduced by each contents receiving apparatus 111 through controlling the session information that is informed by the call connection processing among the first to N+1-th distributing sessions.

Furthermore, the first to N+1-th transmitting units 106-109 can employ either of the following methods:

(a) all of the first to N+1-th transmitting units 106-109 perform multicast or broadcast transmission of packets; and (b) the first to N-th transmitting units 106-108 perform multicast or broadcast transmission of packets, and the N+1-th transmitting unit 109 performs unicast transmission of the packet.

In this case, it is also possible on the contents distributing apparatus 101 side to control the degree of the quality and the quality stability of the contents to be reproduced in the contents receiving apparatus 111 through the control of the call connection processing by, for example, informing the information for the multicast reception to all the contents receiving apparatuses 111 and performing the unicast distribution only to a specific contents receiving apparatus 111.

Next, the contents receiving apparatus 111 will be described in detail.

A call connection processing unit 112 establishes a call by exchanging at least one of the followings between the call connection processing unit 102 of the contents distributing apparatus 101 via the transmission line 130:

(a) address of the contents receiving apparatus 111;

(b) receiving port numbers of the first to N+1-th receiving devices 114-117;

(c) correspondence of the layer and/or compression rate of the encoded data received by the first to N+1-th receiving devices 114-117 and the identifying information added to the packet;

(d) whether or not the encoded data received by the first to N+1-th receiving devices 114-117 is encrypted;

(e) cipher key data of the encoded data received by the first to N+1-th receiving devices 114-117; and (f) receiving buffer size based on the time difference between the encoded data received by the first to N+1-th receiving devices 114-117.

When necessary, the report transmitting unit 113 transmits the RR (Receiver Report) of RTCP or the information corresponding thereto to a report receiving unit 105 of the contents distributing apparatus 101 via the network 130 for reporting the receiving state to the contents distributing apparatus 101.

The first to N+1-th receiving units 114-117 receive the encoded data from the respective sessions. Each receiving unit checks whether or not there is an influence of the data error being imposed during the transmission by the check sum of UDP or a corresponding function. When there is an error, the packet is discarded. When there is no error, the packet is outputted to the encoded data reconstruction unit 118. Even if there is an error contained in the received packet, it is possible to use the extracted encoded data without discarding it provided that: the information corresponding to the data identifying information can be obtained form the received session or the like; the encoded data can be extracted; and it is found that there is only an error in an unimportant part of the encoded data.

At this time, when the picture data receiving apparatus 111 is used under the environment with limited useable electric power like the case where it is operated by batteries/cells, for example, and/or when the receiving environment is fine and the encoded data of the highest quality can be received with almost no error and fault, there may be performed a control for stopping the reception of other encoded data and extending the use time of the apparatus as much as possible. Inversely, when the picture data receiving apparatus 111 has a large-capacity battery or an AC power source connected thereto, all the encoded data may be received. Like the manner described above, reception of the data can be controlled in accordance with the useable power and the receiving environment. Alternatively, it may be structured such that the number of receiving encoded data can be set in the picture data receiving apparatus 111 by the user.

Figure 7:
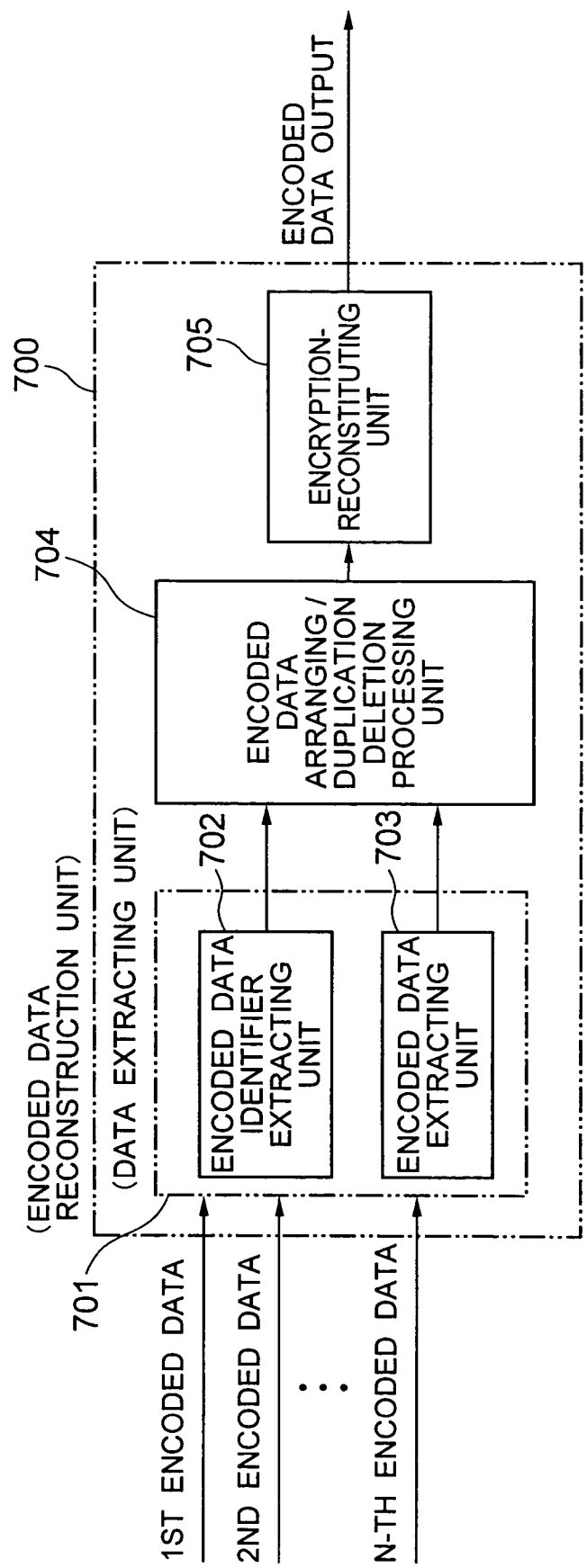
[FIG. 7] A block diagram for showing an encoded data reconstruction unit of FIG. 1.

Next, the encoded data reconstruction unit 118 will be described by referring to FIG. 7. An encoded data identifier extracting unit 702 of a data extracting unit 701 extracts the encoded data identifying information of the first to N-th encoded data, and an encoded data extracting unit 703 extracts the encoded data, respectively. The data identifying information is constituted with the data indicating the compression rate of the received encoded data, and/or which number (the order) of the encoded data it is, and/or which layer of the encoded data it is in the scalable encoding, and the sequence number of the RTP header indicating the order of the encoded data transmission unit or the identification number corresponding thereto. At this time, the information other than the order information can also be judged from the session by which the encoded data is received. An encoded data arranging/duplication deleting unit 704 judges the duplication of the encoded data transmission units of the extracted encoded data from the sequence number of the RTP header or the identification number corresponding thereto, selects the encoded data transmission unit with the lowest compression rate from the data identifying information, and reconstructs those to one piece of encoded data to be outputted to an encryption-restoring unit 705. The first to N-th encoded data are transmitted by the contents distributing side with a time difference provided therebetween. Therefore, the encoded data arranging/duplication deleting unit 704 is provided with a receiving buffers which can deal with the encoded data with the time difference obtained by the call connection processing unit 112 or the time difference set in advance between the contents distributing apparatus 101 and the contents receiving apparatus 111. The encryption-restoring unit 705 decodes and outputs the cipher when necessary based on the presence of the encryption obtained by the call connection processing unit 112 and the information regarding the cipher key, or the information determined in advance between the contents distributing apparatus 101 and the contents receiving apparatus 111. Restoration of the cipher is carried out only on the reconstructed encoded data after selection. Thus, restoration can be achieved by the necessary and minimum processing amount.

A decoder 119 decodes the reconstructed encoded data and reproduces the media. Decoding is carried out only on one piece of the reconstructed encoded data, so that there is no increase in the processing amount required for decoding in the present invention.

A plurality of the transmission lines 130 maybe provided so that each distribution session of the first to N+1-th encoded data transmission units, the call connection processing information, and the receiving state report information are transmitted through the different transmission lines.

Furthermore, it is needless to say that each function and processing of the call connection processing unit 102, the transmission managing unit 103, the data reading/generating/converting unit 104, the report receiving unit 105, and the first to N+1-th transmitting units 106-109 of the contents distributing apparatus 101 may be achieved by the program control executed by a computer that constitutes the contents distributing apparatus 101. It is also needless to say that each function and processing of the call connection processing unit 112, the report transmitting unit 113, the first to N+1-th receiving units 114-117, the encoded data reconstruction unit 118, the decoder 119 of the contents receiving apparatus 111 may be achieved by the program control executed by a computer that constitutes the contents receiving apparatus 111.

SECOND EMBODIMENT

In the manner described below, a second embodiment of the present invention performs, between the transmitter side and the receiver side, contents distribution of the N-number of encoded data of the same contents of the scalable encoding constituted with M-layers where, "M" and "N" are integers of 2 or larger.

The transmitter side comprises the first to N+1-th data transmitting devices and a device for performing multiplexing and transmission of the outputs thereof, and transmits the multiplexed data by the same session. The receiver side comprises a device for receiving the multiplexed encoded data, which extracts the encoded data that is received without a transmission error and a fault, and performs reconstruction and output thereof.

Further, like the first embodiment, the picture data transmitting apparatus according to the second embodiment of the present invention may have a structure with a device for setting the routing priority control of the transmission lines in the session for transmitting the encoded data and the power control of the radio transmission lines.

Figure 8:
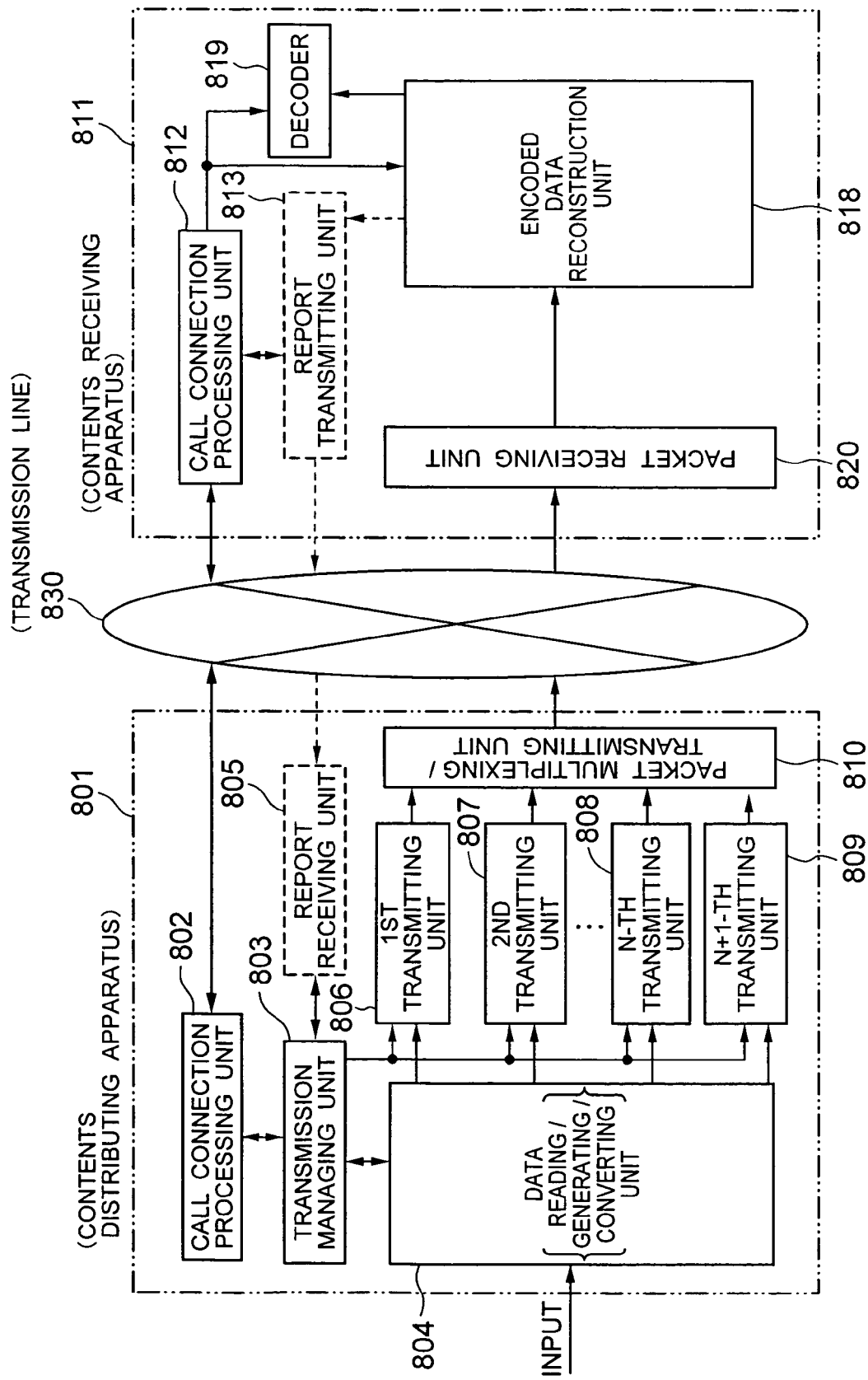
[FIG. 8] A block diagram for showing a second embodiment of the present invention.

A contents distributing apparatus 801, a contents receiving apparatus 811, and a transmission line 830 according to the second embodiment of the present invention shown in FIG. 8 correspond to the contents distributing apparatus 101, the contents receiving apparatus 111, and the transmission line 130 of the first embodiment shown in FIG. 1, respectively. A call connection processing unit 802, a transmission managing unit 803, a data reading/generating/converting unit 804, a report receiving unit 805, transmitting units 806-809, a call connection processing unit 812, a report transmitting unit 813, a decoder 819, and an encoded data reconstruction unit 818 shown in FIG. 8 also correspond to the call connection processing unit 102, the transmission managing unit 103, the data reading/generating/converting unit 104, the report receiving unit 105, the transmitting units 106-109, the call connection processing unit 112, the report transmitting unit 113, the decoder 119, and the encoded data reconstruction unit 118 of FIG. 1, respectively. In the followings, there will be described only the part different from that of the first embodiment.

The first to N+1-th transmitting units 806-809 of FIG. 8 will be described by referring to FIG. 9. A transmitting unit 900 of FIG. 9 corresponds to the transmitting unit 500 of FIG. 6, and a packet processing unit 901, an encoded data dividing unit 902, an encryption processing unit 903, an encoded data identifier adding unit 904, an error detection code adding unit 905, a delay adding unit 906, and a transmission data selecting unit 907 of FIG. 9 correspond to the packet processing unit 501, the encoded data dividing unit 502, the encryption processing unit 503, the encoded data identifier adding unit 504, the error detection code adding unit 505, the delay adding unit 506, and the transmission data selecting unit 507 of FIG. 6. However, the transmitting unit 900 is not provided with a structure corresponding to the transmitting unit 508 of FIG. 6, and the transmission data selecting unit 907 outputs the packet to the packet multiplexing/transmitting unit 810.

The packet multiplexing/transmitting unit 810 multiplexes the packet data from the first to N+1-th transmitting units 806-809 and transmits it to the contents receiving apparatus 811 via the transmission line 830. In the embodiment, there is a single distributing session. Thus, there is no control of the quality and the stability of the contents performed by controlling the transmitting target of the session information, and the transmitting method is one of multicast, broadcast, or unicast transmission.

The packet receiving unit 820 performs the same processing as that of the first to N+1-th receiving units 114-117 of the first embodiment. The encoded data reconstruction unit 818 performs the same processing as that of the encoded data reconstruction unit 118 of the first embodiment. However, unlike the first embodiment, the encoded data reconstruction unit 818 cannot obtain the information corresponding to the encoded data identifying information form the received session.

Except for those described above, each part is the same as the corresponding part of the first embodiment.

A plurality of the transmission lines 830 maybe provided so that the distribution session of the multiplexed first to N-th encoded data, the call connection processing information, and the receiving state report information are transmitted through the different transmission lines.

Furthermore, it is needless to say that each function and processing of the call connection processing unit 802, the transmission managing unit 803, the data reading/generating/converting unit 804, the report receiving unit 805, the first to N+1-th transmitting units 806-809, and the packet multiplexing/transmitting unit 810 of the contents distributing apparatus 801 may be achieved by the program control executed by a computer that constitutes the contents distributing apparatus 801. It is also needless to say that each function and processing of the call connection processing unit 812, the report transmitting unit 813, the encoded data reconstruction unit 818, the decoder 819, and the packet receiving/separating unit 820 of the contents receiving apparatus 811 may be achieved by the program control executed by a computer that constitutes the contents receiving apparatus 811.

THIRD EMBODIMENT

In a third embodiment of the present invention, the transmitter side and the receiver side operate in the following manner for the N-number of encoded data of the same contents encoded by the scalable encoding constituted with M-layers where, "M" and "N" are integers of 2 or larger.

The transmitter side comprises the first to N+1-th data transmitting devices and at least one device for multiplexing and transmitting at least two of the outputs therefrom, which transmits the multiplexed data and the data without multiplexing by the respective sessions. The receiver side comprises a device for receiving the multiplexed data and the data without multiplexing by the respective sessions, which extracts the encoded data received without transmission error and a fault for performing reconstruction and output thereof.

Further, like the first embodiment, the picture data transmitting apparatus according to the third embodiment of the present invention also comprises a device for setting, by each session, the routing priority control of the transmission lines in at least one session for transmitting the encoded data and the power control of the radio transmission lines. The picture data receiving apparatus may be in a structure having a device for selecting the reception of at least one session based on at least one of: the error/loss rate of the received data; power that can be used in the receiving apparatus; and the setting set in advance.

Figure 10:
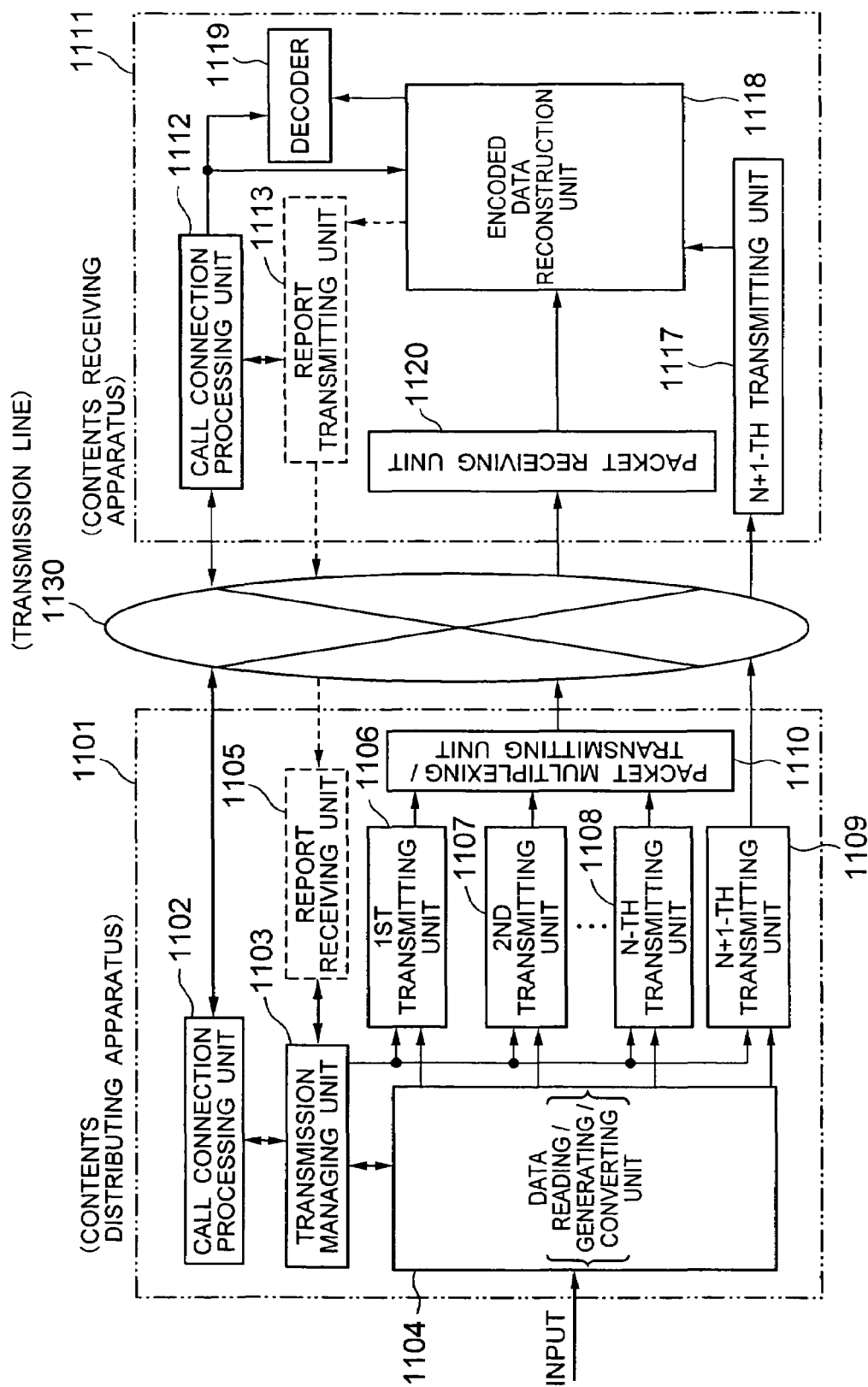
[FIG. 10] A block diagram for showing a third embodiment of the present invention.

In the third embodiment of the present invention shown in FIG. 10, a contents distributing apparatus 1101, a contents receiving apparatus 1111, and a transmission line 1130 correspond to the contents distributing apparatus 801, the contents receiving apparatus 811, and the transmission line 830 of FIG. 8, respectively. A call connection processing unit 1102, a transmission managing unit 1103, a data reading/generating/converting unit 1104, a report receiving unit 1105, transmitting units 1106-1109, a packet multiplexing/transmitting unit 1110, a call connection processing unit 1112, a report transmitting unit 1113, a decoder 1119, an encoded data reconstruction unit 1118, a receiving unit 1117, and a packet receiving unit 1120 shown in FIG. 10 correspond to the call connection processing unit 802, the transmission managing unit 803, the data reading/generating/converting unit 804, the report receiving unit 805, the transmitting units 806-809, the packet multiplexing/transmitting unit 810, the call connection processing unit 812, the report transmitting unit 813, the decoder 819, the encoded data reconstruction unit 818, and the packet receiving unit 820 of FIG. 8, respectively. In the followings, there will be described only the part different from that of the second embodiment.

Among the first to N+1-th transmitting units 1106-1109, the first to N-th transmitting units 1106-1108 perform the same processing as that of the first to N-th transmitting units 806-808 of FIG. 8. In the meantime, the N+1-th transmitting unit 1109 performs the same processing as that of the N+1-th transmitting unit 109 of FIG. 1.

The N+1-th receiving unit 1117 performs the same processing as that of the N+1-th receiving unit 117 of FIG. 1.

The encoded data reconstruction unit 1118 performs the same processing as that of the encoded data reconstruction unit 818 of FIG. 8. In the embodiment, however, not only the first to N-th data identifying information but also the information corresponding to the data identifying information can be obtained based on which session the data is received from, so that it can be used to select the encoded data as in the first embodiment.

Except for those described above, each part is the same as the corresponding part of the first embodiment.

In the embodiment, there has been described that the outputs of the first to N-th transmitting units 1106-1108 are multiplexed and transmitted, which are then received and separated. However, it is possible to multiplex and separate the outputs of the first to N-th transmitting units 1106-1108 in arbitrary combinations.

In the embodiment, there has been described that there are one each of the packet multiplexing/transmitting unit 1110 and the packet receiving/separating unit 1120. However, the same effect can be achieved with a plurality of those units. Further, with a plurality of transmitting/receiving units for transmitting/receiving the packets by the respective separate sessions without interposing the packet multiplexing/transmitting unit 1110 and the packet receiving/separating unit 1120, it is also possible to achieve the same effect. In this case, it is needles to say that the contents distributing apparatus 1101 side can control the quality and the stability of the reproduced contents by each contents receiving apparatus 1111 through control of the session information informed by the call connection processing as in the first embodiment. Furthermore, it is needless to say that the multicast, broadcast, or unicast can be selected for each distributing session.

A plurality of the transmission lines 1130 may be provided so that the session of distributing the multiplexed output of the first to N-th transmitting units 1106-1108, the session of distributing the output of the N+1-th transmitting unit 1109, the call connection processing information, and the receiving state report information are transmitted through the different transmission lines.

Furthermore, it is needless to say that each function and processing of the call connection processing unit 1102, the transmission managing unit 1103, the data reading/generating/converting unit 1104, the report receiving unit 1105, the first to N+1-th transmitting units 1106-1109, and the packet multiplexing/transmitting unit 1110 of the contents distributing apparatus 1101 may be achieved by the program control executed by a computer that constitutes the contents distributing apparatus 1101. It is also needless to say that each function and processing of the call connection processing unit 1112, the report transmitting unit 1113, the encoded data reconstruction unit 1118, the decoder 1119, and the packet receiving/separating unit 1120 of the contents receiving apparatus 1111 may be achieved by the program control executed by a computer that constitutes the contents receiving apparatus 1111.

FOURTH EMBODIMENT

In a fourth embodiment of the present invention, the transmitter side and the receiver side operate in the following manner for the N-number of encoded data of the same contents encoded by the scalable encoding constituted with M-layers where, "M" and "N" are integers of 2 or larger, and for the error correction code data.

The transmitter side comprises the first to N-th encoded data transmitting devices and an FEC data transmitting device, and each transmitting device transmits the encoded data by the different session from each other. The receiver side comprises the first to N-th encoded data receiving devices and an FEC data receiving device, which extracts the encoded data received without transmission error with no fault and, when there is an error or fault generated in the data, restores the data by the error correction code for reconstructing it to be outputted.

Further, in the fourth embodiment of the present invention, the picture data transmitting apparatus comprises a device for setting, by each session, the routing priority control of the transmission lines in at least one session for transmitting the data and the power control of the radio transmission lines. The picture data receiving apparatus may be in a structure having a device for selecting the reception of at least one session based on at least one of: the error/loss rate of the received data; power that can be used in the receiving apparatus; and the setting set in advance.

Figure 11:
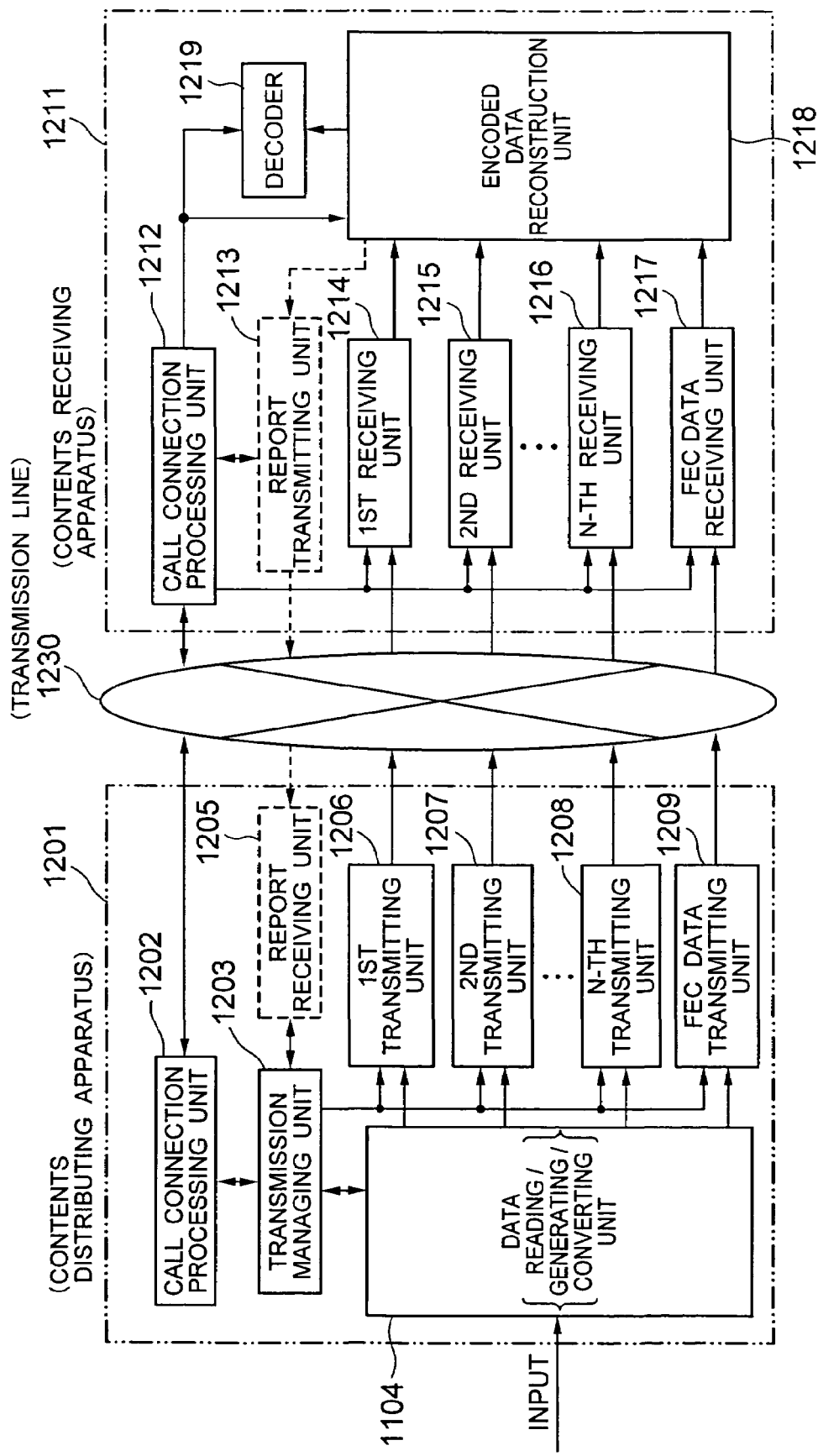
[FIG. 11] A block diagram for showing a fourth embodiment of the present invention.

A contents distributing apparatus 1201, a contents receiving apparatus 1211, and a transmission line 1230 according to the fourth embodiment of the present invention shown in FIG. 11 correspond to the contents distributing apparatus 101, the contents receiving apparatus 111, and the transmission line 130 of FIG. 1, respectively. A call connection processing unit 1202, a transmission managing unit 1203, a data reading/generating/converting unit 1204, a report receiving unit 1205, transmitting units 1206-1208, a call connection processing unit 1212, a report transmitting unit 1213, receiving units 1214-1215, and a decoder 1219 shown in FIG. 11 correspond to the call connection processing unit 102, the transmission managing unit 103, the data reading/generating/converting unit 104, the transmitting units 106-108, the call connection processing unit 112, the report transmitting unit 113, the receiving units 114-115, and the decoder 119 of FIG. 1, respectively. In the followings, there will be described only the part different from that of the first embodiment. The embodiment is described on assumption that the number of error correction code data is "1" for the purpose of simplifying the description, however, it is needless to say that the number of the error correction code data in the present invention is not limited to "1".

The transmission managing unit 1203 performs setting of the items set by the transmitting managing unit 103 of the first embodiment and at least one of:

(i) the transmission-target address and port number to which the FEC data transmitting unit 1209 performs transmission;

(j) the identifying information of the error correction code data transmitted by the FEC data transmitting unit 1209;

(k) the correction-target data of the error correction code data transmitted by the FEC data transmitting unit 1209;

(l) whether or not the error correction code data transmitted by the FEC data transmitting unit 1209 is encrypted;

(m) the cipher key data of the error correction code data transmitted by the FEC data transmitting unit 1209;

(n) the transmission time difference of the error correction code data transmitted by the FEC data transmitting unit 1209; and (o) the routing priority in the transmission line of the session by which the FEC data transmitting unit 1209 performs transmission and the transmission power of the radio transmission line, and informs the setting to the contents receiving apparatus 1211 by the call connection processing unit 1202. Even during the distribution of contents, this setting can be changed by the information regarding the receiving state such as packet loss rate in the contents receiving apparatus 1211, which can be obtained in the report receiving unit 1205.

In addition to the same processing as that of the data reading/generating/converting unit 104 of the first embodiment, the data reading/generating/converting unit 1204 generates the error correction (FEC; Forward Error Correction) code data from the first encoded data. As the error correction codes, there are Reed-Solomon codes, LDPC (LowDensity parity check), convolution codes, etc. The present invention uses these existing methods, so that the detailed explanation is omitted herein. For simplifying the description, the error correction code is to be generated from the first encoded data herein. However, it is needless to say that the error correction code maybe generated from other encoded data or the data of a specific layer of the encoded data.

Like the first to N-th transmitting units 105-108 of the first embodiment, the FEC data transmitting unit 1209 transmits the error correction code data generated by the data reading/generating/converting unit 1204. At the time of transmission, the payload type of the RTP header, SSRC, or CSRC, for example, is used or the identifying information corresponding thereto is added so that it is recognized as the error correction code data. Addition of delay and selecting whether or not to transmit the data in accordance with the distribution band is also performed in the same manner as that of the first embodiment.

The FEC data receiving unit 1217 performs the same processing as that of the first to N-th receiving units 114-116 of the first embodiment. It is also the same as the case of the first embodiment in respect that the reception of data is controlled in accordance with the power which can be used in the contents receiving apparatus 1211.

Figure 12:
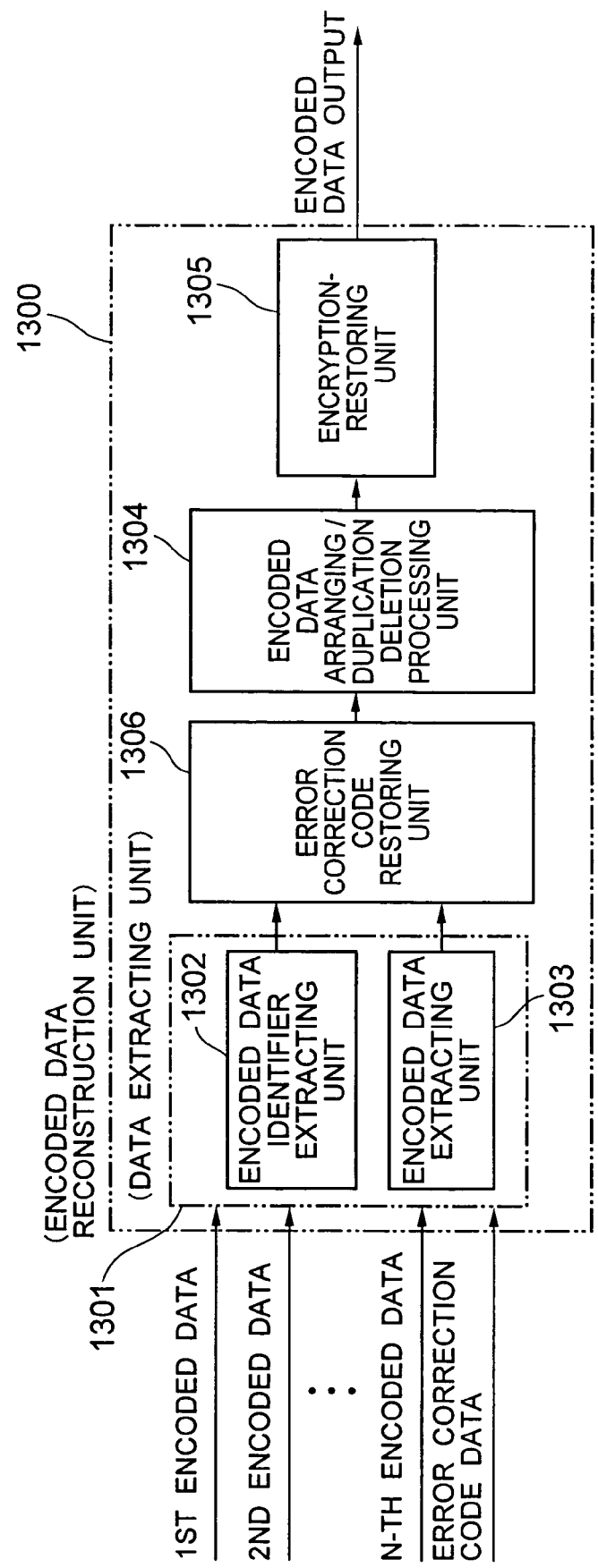
[FIG. 12] A block diagram for showing an encoded data reconstruction unit of FIG. 11.

Next, the encoded data reconstruction unit 1218 will be described by referring to FIG. 12. A data extracting unit 1301, an encoded data identifier extracting unit 1302, an encoded data extracting unit 1303, an encoded data arranging/duplication deletion processing unit 1304 and an encryption-restoring unit 1305 of FIG. 12 are same as the data extracting unit 701, the encoded data identifier extracting unit 702, the encoded data extracting unit 703, the encoded data arranging/duplication deletion processing unit 704 and the encryption-restoring unit 705 of the first embodiment shown in FIG. 7. However, the encoded data identifying information extracted by the encoded data identifier extracting unit 1302 contains the identifying information indicating the error correction code data. When there is a fault of data detected in the data extracting unit 1301, the error correction code restoring unit 1306 tries to restore it by using the error correction code data identified and extracted by the data extracting unit 1301. When the fault data is restored, the restored data is outputted to the encoded data arranging/duplication deletion processing unit 1304.

Except for those described above, each part is the same as the corresponding part of the first embodiment.

A plurality of the transmission lines 1230 may be provided so that the distribution session of the first to N+1-th encoded data and the error correction code data, the call connection processing information, and the receiving state report information are transmitted through the different transmission lines.

Furthermore, it is needless to say that each function and processing of the call connection processing unit 1202, the transmission managing unit 1203, the data reading/generating/converting unit 1204, the report receiving unit 1205, the first to N-th transmitting units 1206-1208, and the FEC data transmitting unit 1209 of the contents distributing apparatus 1201 may be achieved by the program control executed by a computer that constitutes the contents distributing apparatus 1201. It is also needless to say that each function and processing of the call connection processing unit 1212, the report transmitting unit 1213, the first to N-th receiving units 1214-1216, the FEC data receiving unit 1217, the encoded data reconstruction unit 1218 and the decoder 1219 of the contents receiving apparatus 1211 may be achieved by the program control executed by a computer that constitutes the contents receiving apparatus 1211.

FIFTH EMBODIMENT

In a fifth embodiment of the present invention, the transmitter side and the receiver side operate in the following manner for the N-number of encoded data of the same contents encoded by the scalable encoding constituted with M-layers where, "M" and "N" are integers of 2 or larger, and for the error correction code data.

The transmitter side comprises the first to N-th data transmitting devices, an FEC data transmitting device, and a device for performing multiplexing and transmission of the outputs thereof, which transmits the multiplexed data by the same session. The receiver side comprises a device for receiving the multiplexed data, which extracts the encoded data that is received without a transmission error and a fault and, when there is an error or a fault generated in the data, restores it by the error correction code for performing reconstruction and output thereof.

Further, like the second embodiment, the picture data transmitting apparatus according to the fifth embodiment of the present invention may be in a structure with a device for setting the routing priority control of the transmission lines in the session for transmitting the multiplexed data and the power control of the radio transmission lines.

A contents distributing apparatus 1401, a contents receiving apparatus 1411, and a transmission line 1430 according to the fifth embodiment of the present invention shown in FIG. 13 correspond to the contents distributing apparatus 801, the contents receiving apparatus 811, and the transmission line 830 of FIG. 8, respectively. A call connection processing unit 1402, a transmission managing unit 1403, a data reading/generating/converting unit 1404, a report receiving unit 1405, transmitting units 1406-1408, a call connection processing unit 1412, a report transmitting unit 1413, an encoded data reconstruction unit 1418 and an decoder 1419 shown in FIG. 13 correspond to the call connection processing unit 802, the transmission managing unit 803, the data reading/generating/converting unit 804, the report receiving unit 805, the transmitting units 806-808, the call connection processing unit 812, the report transmitting unit 813, the encoded data reconstruction unit 818, and the decoder 819 of FIG. 8. In the followings, there will be described only the part different from that of the second embodiment. The embodiment is described on assumption that the number of error correction code data is "1" for the purpose of simplifying the description, however, it is needless to say that the number of the error correction code data in the present invention is not limited to "1".

The transmission managing unit 1403 performs the same processing as that of the transmission managing unit 1203 of the fourth embodiment.

The data reading/generating/converting unit 1404 performs the same processing as that of the data reading/generating/converting unit 1204 of the fourth embodiment.

Figure 9:
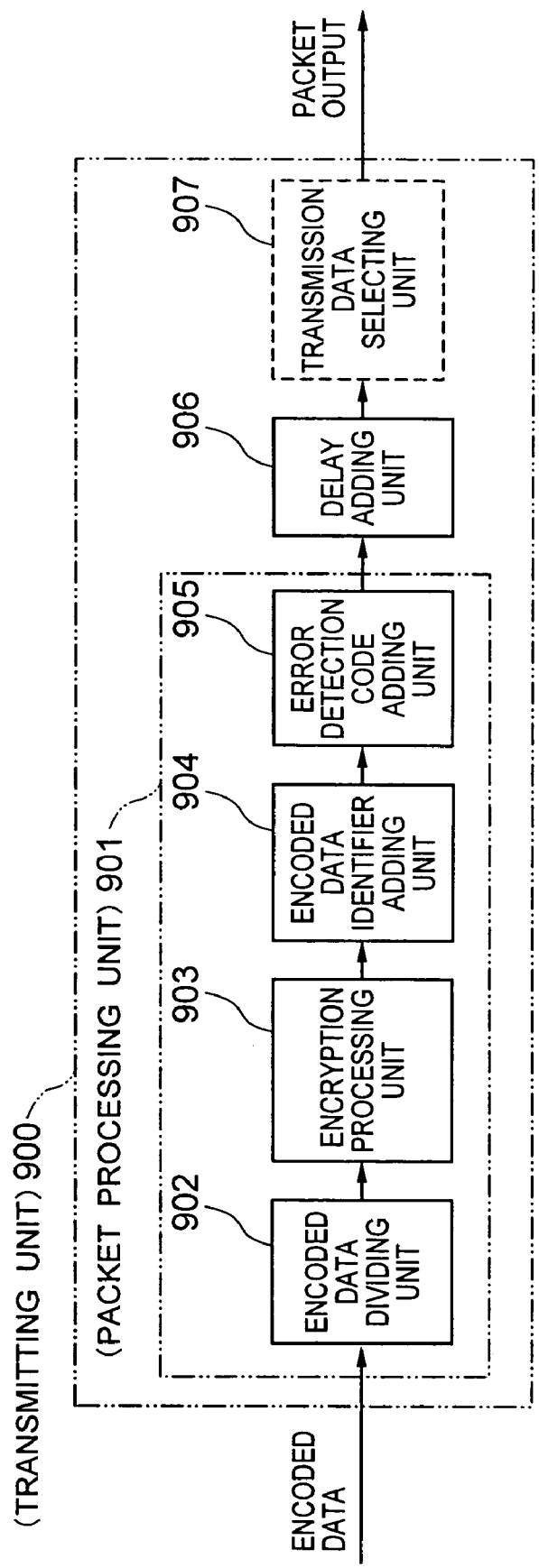
[FIG. 9] A block diagram for showing first to N+1-th transmitting units of FIG. 8.

The FEC data transmitting unit 1409 performs the same processing as that of the transmitting unit 900 shown in FIG. 9 and transmits the error correction code data generated by the data reading/generating/converting unit 1404. At the time of transmission, the payload type of the RTP header, SSRC, or CSRC, for example, is used or the identifying information corresponding thereto is added so that it is recognized as the error correction code data. Addition of delay and selecting whether or not to transmit the data in accordance with the distribution band is also performed in the same manner as that of the second embodiment.

The encoded data reconstruction unit 1418 performs the same processing as that of the encoded data reconstruction unit 1218 of the fourth embodiment.

Except for those described above, each part is the same as the corresponding part of the second embodiment.

A plurality of the transmission lines 1430 may be provided so that the distribution session of the data obtained by multiplexing the first to N-th encoded data and the error correction code data, the call connection processing information, and the receiving state report information are transmitted through the different transmission lines.

Furthermore, it is needless to say that each function and processing of the call connection processing unit 1402, the transmission managing unit 1403, the data reading/generating/converting unit 1404, the report receiving unit 1405, the first to N-th transmitting units 1406-1408, the FEC data transmitting unit 1409 and the packet multiplexing/transmitting unit 1410 of the contents distributing apparatus 1401 may be achieved by the program control executed by a computer that constitutes the contents distributing apparatus 1401. It is also needless to say that each function and processing of the call connection processing unit 1412, the report transmitting unit 1413, the encoded data reconstruction unit 1418, the decoder 1419 and the packet receiving unit 1420 of the contents receiving apparatus 1411 may be achieved by the program control executed by a computer that constitutes the contents receiving apparatus 1411.

SIXTH EMBODIMENT

In a sixth embodiment of the present invention, the transmitter side and the receiver side operate in the following manner for the N-number of encoded data of the same contents encoded by the scalable encoding constituted with M-layers where, "M" and "N" are integers of 2 or larger, and for the error correction code data.

The transmitter side comprises the first to N-th data transmitting devices, an FEC data transmitting device, and a device for multiplexing and transmitting at least two of the outputs thereof, which transmits the multiplexed data and the data without multiplexing by the respective sessions. The receiver side comprises a device for receiving the multiplexed data and the data without multiplexing by the respective sessions, which extracts the encoded data that is received without a transmission error and a fault and, when there is an error or a fault generated in the data, restores it by the error correction code for performing reconstruction and output thereof.

Further, like the third embodiment, the picture data transmitting apparatus according to the fifth embodiment of the present invention also comprises a device for setting, by each session, the routing priority control of the transmission lines in at least one session for transmitting each piece of encoded data and the power control of the radio transmission lines. The picture data receiving apparatus may be in a structure having a device for selecting the reception of at least one session based on at least one of: the error/loss rate of the received data; power that can be used in the receiving apparatus; and the setting set in advance.

A contents distributing apparatus 1501, a contents receiving apparatus 1511, and a transmission line 1530 according to the sixth embodiment of the present invention shown in FIG. 14 correspond to the contents distributing apparatus 1101, the contents receiving apparatus 1111, and the transmission line 1130 of FIG. 10, respectively. A call connection processing unit 1502, a transmission managing unit 1503, a data reading/generating/converting unit 1504, a report receiving unit 1505, transmitting units 1506-1508, a packet multiplexing/transmitting unit 1510, a call connection processing unit 1512, a report transmitting unit 1513, an encoded data reconstruction unit 1518 and a decoder 1519 shown in FIG. 14 correspond to the call connection processing unit 1102, the transmission managing unit 1103, the data reading/generating/converting unit 1104, the report receiving unit 1105, the transmitting units 1106-1108, the packet multiplexing/transmitting unit 1110, the call connection processing unit 1112, the report transmitting unit 1113, the encoded data reconstruction unit 1118 and the decoder 1119 of FIG. 10. In the followings, there will be described only the part different from that of the third embodiment. The embodiment is described on assumption that the number of error correction code data is "1" for the purpose of simplifying the description, however, it is needless to say that the number of the error correction code data in the present invention is not limited to "1".

The transmission managing unit 1503 performs the same processing as that of the transmission managing unit 1203 of the fourth embodiment.

The data reading/generating/converting unit 1504 performs the same processing as that of the data reading/generating/converting unit 1204 of the fourth embodiment.

The FEC data transmitting unit 1509 performs the same processing as that of the FEC data transmitting unit 1209 of the fourth embodiment.

The FEC data receiving unit 1517 performs the same processing as that of the FEC data receiving unit 1217 of the fourth embodiment.

The encoded data reconstruction unit 1518 performs the same processing as that of the encoded data reconstruction unit 1218 of the fourth embodiment.

Except for those described above, each part is the same as the corresponding part of the third embodiment.

A plurality of the transmission lines 1530 may be provided so that the distribution session of the multiplexed outputs of the first to N-th transmitting units 1506-1508, the session of distributing the output of the FEC data transmitting unit 1509, the call connection processing information, and the receiving state report information are transmitted through the different transmission lines.

Furthermore, it is needless to say that each function and processing of the call connection processing unit 1502, the transmission managing unit 1503, the data reading/generating/converting unit 1504, the report receiving unit 1505, the first to N-th transmitting units 1506-1508, the FEC data transmitting unit 1509 and the packet multiplexing/transmitting unit 1510 of the contents distributing apparatus 1501 may be achieved by the program control executed by a computer that constitutes the contents distributing apparatus 1501. It is also needless to say that each function and processing of the call connection processing unit 1512, the report transmitting unit 1513, the encoded data reconstruction unit 1518, the decoder 1519 and the packet receiving unit 1520 of the contents receiving apparatus 1511 may be achieved by the program control executed by a computer that constitutes the contents receiving apparatus 1511.

INDUSTRIAL APPLICABILITY

As described above, the present invention can provide contents distributing and receiving apparatuses, a contents transmitting/receiving system, contents distributing and receiving methods, and contents distribution and reception programs, which can suppress as much as possible the significant disturbance of the reproduced contents on the receiver side caused due to the transmission error of the encoded data. Furthermore, it is possible to provide contents distributing and receiving apparatuses, a contents transmitting/receiving system, contents distributing and receiving methods, and contents distribution and reception programs, which allow users to set trade-off between the transmission band used for contents data transmission and the quality. Moreover, it is possible to suppress as much as possible the significant disturbance of the reproduced contents on the receiver side caused due to the transmission error of the encoded data without sending the feedback information from the receiver side to the transmitter side.

Further, the transmitter side can control the quality and/or the stability of the contents on the receiver side through controlling whether or not to perform encryption at the time of actual transmission and/or controlling the information to be informed to the receiver side by the call connection processing. Furthermore, the aforementioned objects can be achieved while preventing an increase in the operation amount required for decoding the compression-encoded data. Moreover, the power consumption of the receiving apparatus can be controlled in accordance with the power that can be used on the receiving apparatus side.

The invention claimed is:

1. A contents distributing apparatus, comprising
a data output device that outputs encoded data;
a plurality of transmitters that transmits the encoded data outputted from the data output device; and
a computer that controls at least one of the data output device and the plurality of transmitters, wherein:
the data output device outputs data encoded by hierarchical encoding as the encoded data;
each of the plurality of transmitters transmits at least a part of data of at least one layer among the data encoded by the hierarchical encoding.

2. The contents distributing apparatus as claimed in claim 1, wherein:
the data output device outputs the data encoded by the hierarchical encoding by separating it to respective encoded data of each layer; and
each of the plurality of transmitters transmits each of the encoded data individually by each layer.

3. The contents distributing apparatus as claimed in claim 1, wherein each of the plurality of transmitters transmits at least a part of referred-information encoded data of at least one layer among the data encoded by the hierarchical encoding.

4. The contents distributing apparatus as claimed in claim 1, wherein each of the plurality of transmitters transmits, among the data encoded by the hierarchical encoding: a) at least a part of encoded data of one layer; and b) at least a part of referred-information encoded data of at least one layer among remaining layers.

5. The contents distributing apparatus as claimed in claim 1, wherein each of the plurality of transmitters transmits, among the data encoded by the hierarchical encoding: a) at least a part of referred-information encoded data of one layer; and b) at least a part of encoded data of at least one layer among remaining layers.

6. The contents distributing apparatus as claimed in any one of claims 1-5, wherein
each of the plurality of transmitters comprises a transmission managing unit, wherein
the transmission managing unit controls quality and stability and/or confidentiality of distribution contents on the contents distributing apparatus side through controlling at least one of: number of the encoded data to be transmitted; hierarchy of the encoded data; distribution target of a cipher key; encryption method; and degree of encryption.

7. The contents distributing apparatus as claimed in claim 6, wherein, when performing data transmission of a plurality of pieces of encoded data with a time difference provided therebetween, the transmission managing unit changes a compression rate of following encoded data with respect to a compression rate of preceding encoded data with the time difference.

8. The contents distributing apparatus as claimed in claim 7, wherein the transmission managing unit selects the compression rate in accordance with a distribution rate and/or condition of a transmission line.

9. The contents distributing apparatus as claimed in claim 8 wherein the transmission managing unit selects whether or not to transmit at least a part of the encoded data in accordance with the distribution rate and/or the condition of the transmission line.

10. The contents distributing apparatus as claimed in claim 1, wherein the transmitting device performs data transmission including encoded data of layers higher than hierarchy of the data to be transmitted.

11. The contents distributing apparatus as claimed in claim 1, wherein the transmission managing unit controls the quality and stability of the distribution contents on a contents distributing side through controlling informing target of session information of a session by which the encoded data is transmitted.

12. A contents receiving apparatus, comprising:
a plurality of receivers that receives device for receiving encoded data transmitted by a plurality of transmitters;
a device that receives the encoded data received by each of the plurality of receivers, and discriminates and separates individual encoded data units therefrom; and
a reconstruction device which extracts encoded data received without a transmission error and a fault from the discriminated and separated encoded data, and reconstructs and outputs encoded data from the extracted encoded data; and
a computer that controls at least one of the plurality of receivers, the device and the reconstruction device.

13. The contents receiving apparatus as claimed in claim 12, wherein, when reconstructing the encoded data, the reconstruction device judges duplication of the encoded data from identifiers given to encoded data transmission units.

14. The contents receiving apparatus as claimed in claim 12, wherein the reconstruction device judges a compression rate and/or hierarchy of the encoded data from at least one of:
a) an encoded data receiving session determined in advance;
b) encoded data identifying information determined in advance, which is given to the encoded data transmission unit;
c) an encoded data receiving session informed by call connection processing; and
d) the encoded data identifying information which is given to the encoded data transmission unit and informed by the call connection processing.

15. The contents receiving apparatus as claimed in any one of claims 12-14, comprising a report transmitting unit that transmits a receiving state report to inform condition of a transmission line.

16. A contents transmitting/receiving system, comprising a contents distributing apparatus, a contents receiving apparatus, and a communication network that connects the contents distributing apparatus and the contents receiving apparatus, wherein:
the contents distributing apparatus comprises
a data output device that outputs encoded data;
a plurality of transmitters that transmit at least a part of data of at least one layer among the data encoded by the hierarchical encoding outputted from the data output device; and
a first computer that controls at least one of the data output device and the plurality of transmitters; and
the contents receiving apparatus comprises
a plurality of receivers that receive device for receiving encoded data transmitted by the a plurality of transmitter;
a device that receives the encoded data received by each of the plurality of receivers, and discriminates and separates individual encoded data units therefrom;
a reconstruction device which extracts encoded data received without a transmission error and a fault from the discriminated and separated encoded data, and reconstructs and outputs encoded data from the extracted encoded data; and
a second computer that controls at least one of the plurality of receivers, the device and the reconstruction device.

17. A contents distributing method, comprising the steps of:
- an output step of outputting encoded data; and
- a transmission step of transmitting the encoded data outputted in the output step by a plurality of transmitters, wherein
  - data encoded by hierarchical encoding is outputted as the encoded data in the output step, wherein the encoding is performed by a computer, and
  - at least a part of data of at least one layer among the data encoded by the hierarchical encoding is transmitted by each of the plurality of transmitters in the transmission step.

18. The contents distributing method as claimed in claim 17, wherein
- in the output step, the data encoded by the hierarchical encoding is separated to respective encoded data of each layer to be outputted; and
- in the transmission step, each of the encoded data is transmitted by each layer by each of the plurality of transmitters.

19. The contents distributing method as claimed in claim 17, wherein, in the transmission step, there is transmitted, by each of the plurality of transmitters, at least a part of referred-information encoded data of at least one layer among the data encoded by the hierarchical encoding.

20. The contents distributing method as claimed in claim 17, wherein, in the transmission step, among the data encoded by the hierarchical encoding, there is transmitted by each of the plurality of transmitters: a) at least a part of encoded data of a first layer; and b) at least a part of referred-information encoded data of at least one layer among remaining layers.

21. The contents distributing method as claimed in claim 17, wherein, in the transmission step, among the data encoded by the hierarchical encoding, there is transmitted by each of the plurality of transmitters: a) at least a part of referred-information encoded data of a first layer; and b) at least a part of encoded data of at least one layer among remaining layers.

22. The contents distributing method as claimed in any one of claims 17-21, wherein quality and stability and/or confidentiality of distribution contents is controlled on the contents distributing apparatus side through controlling, on the contents distributing side, number of the encoded data to be transmitted, hierarchy of the encoded data, distribution target of a cipher key and/or encryption method and/or degree of encryption.

23. The contents distributing method as claimed in claim 22, wherein, when performing data transmission of a plurality of pieces of encoded data with a time difference provided therebetween, a compression rate of following encoded data is changed with respect to a compression rate of preceding encoded data with the time difference.

24. The contents distributing method as claimed in claim 23, wherein the compression rate is selected in accordance with a distribution rate and/or condition of a transmission line.

25. The contents distributing method as claimed in any one of claims 17-21, data transmission is performed including encoded data of layers higher than hierarchy of the data to be transmitted.

26. The contents distributing method as claimed in any one of claims 17-21, wherein the quality and stability of the distribution contents is controlled on a contents distributing side through controlling informing target of session information of a session by which the encoded data is transmitted.

27. The contents distributing method as claimed in claim 17, wherein the output step comprises at least one of the steps of
- (a) a step of first to N-th encoded data;
- (b) a step of encoded data, and a generating step of the first to N-th encoded data from data of at least one layer among the encoded data inputted in the step;
- (c) an step of a first encoded data, and a generating step of second to N-th encoded data from data of at least one layer of the first encoded data inputted in the step;
- (d) an encoding step of encoding an inputted signal into the first to N-th encoded data; and
- (e) an encoding step of encoding the inputted signal into the first encoded data, and a generating step of the second to N-th encoded data from data of at least one layer of the first encoded data inputted in the step.

28. The contents distributing method as claimed in claim 27, wherein, (N+1)-th encoded data is outputted in addition to the N-th encoded data.

29. The contents distributing method as claimed in claim 28, wherein identifiers for identifying data are given to the first to (N+1)-th encoded data.

30. The contents distributing method as claimed in claim 28 or 29, wherein each of the first to (N+1)-th encoded data is transmitted by a different session.

31. The contents distributing method as claimed in claim 28 or 29, wherein the first to (N+1)-th encoded data are multiplexed to be transmitted.

32. The contents distributing method as claimed in claim 28 or 29, wherein, among the first to (N+1)-th encoded data, at least two pieces of encoded data are multiplexed, and the multiplexed data and remaining encoded data without multiplexing are transmitted, respectively, by different sessions.

33. The contents distributing method as claimed in any one of claims 27, 28 or 29, wherein a contents distributing side controls an informing target of session information of a session by which the encoded data is transmitted.

34. The contents distributing method as claimed in any one of claims 28 or 29, wherein the first to (N+1)-th encoded data are distributed with a time difference provided therebetween.

35. The contents distributing method as claimed in claim 34, wherein the time difference is set in accordance with condition of a transmission line and/or an encoding compression rate and/or a distribution rate and/or a rule determined in advance.

36. A contents receiving method, comprising the steps of:
- a receiving step of receiving encoded data transmitted by a plurality of transmitters;
- a step of discriminating and separating individual encoded data units therefrom wherein the discriminating and separating is performed by a computer; and
- a reconstruction step of extracting encoded data received without a transmission error and a fault from the discriminated and separated encoded data, and reconstructing and outputting encoded data from the extracted encoded data.

37. The contents receiving method as claimed in claim 36, wherein, when reconstructing the encoded data, duplication of the encoded data is judged from identifiers given to encoded data transmission units.

38. The contents receiving method as claimed in claim 36, wherein a compression rate and/or hierarchy of the encoded data is judged from at least one of:
- a) an encoded data receiving session determined in advance;

b) encoded data identifying information determined in advance, which is given to the encoded data transmission unit;

c) an encoded data receiving session informed by call connection processing; and d) the encoded data identifying information which is given to the encoded data transmission unit and informed by the call connection processing.

39. The contents receiving method as claimed in any one of claims 36-38, wherein a receiving state report is transmitted for informing condition of a transmission line.

40. The contents receiving method as claimed in any one of claims 36-38, wherein, in the receiving step, the encoded data is received by securing a buffer size determined by at least one of:

(a) a receiving buffer size determined in advance;

(b) a buffer size informed by call connection processing; and (c) a buffer size calculated based on a contents distributing rate and time-difference setting information, which is set in advance and/or informed by call connection.

41. A contents transmitting/receiving method, comprising the steps of:

an output step of outputting data encoded by hierarchical encoding wherein the encoding is performed by a computer;

a transmission step of transmitting by a plurality of transmitters at least a part of data of at least one layer among the data encoded by the hierarchical encoding;

a receiving step of receiving encoded data transmitted by the plurality of transmitters;

a step of discriminating and separating individual encoded data units from the received encoded data wherein the discriminating and separating is performed by a computer; and a reconstruction step of extracting encoded data received without a transmission error and a fault from the discriminated and separated encoded data, and reconstructing and outputting the extracted encoded data.

42. The contents distributing apparatus as claimed in claim 1 comprising an error correction code data transmitting device, wherein the error correction code data transmitting device transmits error correction code data generated from data of at least one layer among the encoded data.

43. The contents distributing apparatus as claimed in claim 42, wherein the transmitting device transmits encoded data and error correction code data individually by different sessions.

44. The contents distributing apparatus as claimed in claim 42, comprising a multiplexed transmitting device, wherein the multiplexed transmitting device multiplexes the encoded data and the error correction code data individually, and transmits the multiplexed data by a same session.

45. The contents distributing apparatus as claimed in claim 42, comprising the multiplexed transmitting device, wherein the multiplexed transmitting device multiplexes a part of encoded data and error correction code data, and transmits the multiplexed data and the data without multiplexing by respective sessions.

46. The contents distributing apparatus as claimed in claim 42, comprising a device for performing at least one of a routing priority control of per-session transmission lines and a power control of radio transmission lines by a session which transmits at least one of encoded data and error correction code data.

47. The contents receiving apparatus as claimed in claim 12, wherein the reconstruction device restores, by an error correction code, data in which an error or a fault is generated, and reconstructs the data.

48. The contents receiving apparatus as claimed in claim 12, wherein the reconstruction device restores multiplexed data in which an error or a fault is generated by an error correction code, and reconstructs the data.

49. The contents receiving apparatus as claimed in claim 12, wherein the reconstruction device restores data without multiplexing and multiplexed data in which an error or a fault is generated by an error correction code and reconstructs the data.

50. The contents receiving apparatus as claimed in claim 12, comprising a device for selecting whether or not to receive encoded data based on at least one of: error/loss rate of the received data; power that can be used in the receiving apparatus; and a setting determined in advance.

51. The contents distributing apparatus as claimed in claim 1, wherein the plurality of transmitters transmit the encoded data in different sessions.

52. The contents receiving apparatus as claimed in claim 12, wherein the encoded data is transmitted in different sessions by the plurality of transmitters.

53. The contents transmitting/receiving system as claimed in claim 16, wherein the plurality of transmitters transmit the encoded data in different sessions.

54. The contents distributing method as claimed in claim 17, wherein the encoded data is transmitted in different sessions by the plurality of transmitters.

55. The contents receiving method as claimed in claim 36, wherein the encoded data is transmitted in different sessions by the plurality of transmitters.

56. The contents transmitting/receiving method as claimed in claim 41, wherein the encoded data is transmitted in different sessions by the plurality of transmitters.

* * * * *

UNITED STATES PATENT AND TRADEMARK OFFICE
CERTIFICATE OF CORRECTION

PATENT NO. : 7,627,184 B2  Page 1 of 1
APPLICATION NO. : 10/578023
DATED : December 1, 2009
INVENTOR(S) : Hiroaki Dei and Kazunori Ozawa It is certified that error appears in the above-identified patent and that said Letters Patent is hereby corrected as shown below:

Column 13, line 37 Delete "I11" and insert --111--

Column 16, line 59 Delete "obtain form" and insert --obtained from--

Column 24, line 11 Delete "an decoder" and insert --a decoder--

Signed and Sealed this

Seventeenth Day of August, 2010

David J. Kappos
*Director of the United States Patent and Trademark Office*